(12) United States Patent
Monga et al.

(10) Patent No.: US 11,611,484 B2
(45) Date of Patent: Mar. 21, 2023

(54) SYSTEM AND METHOD FOR USE OF VIRTUAL OR AUGMENTED REALITY WITH DATA CENTER OPERATIONS OR CLOUD INFRASTRUCTURE

(71) Applicant: ORACLE INTERNATIONAL CORPORATION, Redwood Shores, CA (US)

(72) Inventors: Amarpal Monga, Seattle, WA (US); Alex Hamilton, Seattle, WA (US); Iliya Roitburg, Seattle, WA (US); Edward Wallace, Seattle, WA (US); Kannan Raj, San Diego, CA (US); Wentao Deng, Seattle, WA (US); Brian Ho, New York City, NY (US); Giuliano Pennesi, Reading (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/071,830

(22) Filed: Oct. 15, 2020

(65) Prior Publication Data

US 2021/0112145 A1 Apr. 15, 2021

Related U.S. Application Data

(60) Provisional application No. 62/915,422, filed on Oct. 15, 2019.

(51) Int. Cl.
*H04L 41/22* (2022.01)
*H04L 41/12* (2022.01)
(Continued)

(52) U.S. Cl.
CPC ............ *H04L 41/12* (2013.01); *G06T 19/006* (2013.01); *G06V 10/80* (2022.01); *H04L 67/131* (2022.05)

(58) Field of Classification Search
CPC ....... H04L 67/38; H04L 67/131; H04L 41/22; G06T 19/06; G06V 40/23
(Continued)

(56) References Cited

U.S. PATENT DOCUMENTS

| 8,760,471 B2 | 6/2014 | Ihara et al. |
| 9,557,807 B2 | 1/2017 | Mick et al. |

(Continued)

FOREIGN PATENT DOCUMENTS

| EP | 3318945 | 5/2015 |
| EP | 3324313 | 5/2018 |

OTHER PUBLICATIONS

European Patent Office, International Searching Authority, International Search Report and Written Opinion dated Feb. 1, 2021 for International Application No. PCT/US2020/55825, 16 pages.

(Continued)

*Primary Examiner* — Sibte H Bukhari
(74) *Attorney, Agent, or Firm* — Tucker Ellis LLP

(57) ABSTRACT

In accordance with an embodiment, described herein is a system and method for use of virtual reality and/or augmented reality with data center operations and cloud infrastructure services. The approach leverages virtual reality and/or augmented reality, and insights from various sources of data describing the operation of the data center, including data center analytics, for facilitating in-situ diagnostics, operations, monitoring, maintenance, repair, health prognostics, and remote collaboration, toward enhancing the efficiency of managing and running data centers. In accordance with an embodiment, the system can operate with VR/AR (Continued)

devices that can be provided as VR/AR headsets or other devices, that include sensors that measure a data center operator's position, orientation, and movement within a cloud infrastructure or data center environment, and can display a visualization associated with the physical devices of the data center environment, including where appropriate information from other sources useful in performing data center operations.

19 Claims, 20 Drawing Sheets

(51) Int. Cl.
  *G06T 19/00*  (2011.01)
  *H04L 67/131* (2022.01)
  *G06V 10/80*  (2022.01)
(58) Field of Classification Search
  USPC .......................................................... 709/203
  See application file for complete search history.

(56) References Cited

U.S. PATENT DOCUMENTS

| | | | |
|---|---|---|---|
| 9,838,844 B2 | 12/2017 | Emeis et al. | |
| 2012/0249588 A1 | 10/2012 | Tison et al. | |
| 2014/0006762 A1 | 1/2014 | Bittner et al. | |
| 2014/0330511 A1 | 11/2014 | Tison et al. | |
| 2015/0235367 A1* | 8/2015 | Langer | G06K 9/52 348/135 |
| 2016/0140868 A1* | 5/2016 | Lovett | G06T 19/006 434/118 |
| 2017/0091607 A1 | 3/2017 | Emeis et al. | |
| 2019/0310758 A1* | 10/2019 | Agarawala | H04L 67/22 |
| 2020/0269131 A1* | 8/2020 | Pereira | G06F 8/656 |

OTHER PUBLICATIONS

Stanley, Tom, Gotham Technology Group, LLC., "Splunk Secure Mobile Access for iOS", retrieved on Feb. 1, 2020 from: <https://www.gothamtg.com/blog/splunk-secure-mobileaccess-for-ios>, 4 pages.

Dotson, Kyt, "Splunk brings augmented reality into the server room", retrieved on Feb. 1, 2020 from: <https://siliconangle.com/2019/04/30/splunk-bringsaugmented-reality-server-room>, 6 pages.

Splunk Inc., "Splunk Augmented Reality Experience Your Data", Splunk® > © 2009, retrieved from: <https://www.splunk.com/pdrs/ebooks/splunk-andaugmented-reality.pdf>, 10 pages.

Rocchetti, Enrico, "Taking datacenter operations to the next step of digitization with augmented reality", Ericsson Blog, retrieved on Feb. 1, 2020 from <https://www.ericsson.com/en/blog/2019/2/datacenteroperations-with-augmented-reality>, 5 pages.

Mobiliya—Quest Global Company, "AR360 for Enabling & Managing AR/VR Deployments Seamlessly" (www.mobiliya.com), retrieved on Jan. 2, 2020, 5 pages.

Kobal, Davor, "All Data center operations supported by augmented reality", Inceptum Blog, Jun. 9, 2019, retrieved on from: <https://www.inceptum.hr/data-center-operationssupported-by-augmented-reality>, 13 pages.

Equinix | Interconnections, Equinix Editor, "The World's First Mixed Reality Data Center", Equinix Blog published Apr. 1, 2018, 3 pages , retrieved from: <https://blog.equinix.com/blog/2018/04/01/the-worlds-first-mixed-reality-data-center/>.

"Virtual reality", Wikipedia, last edited Dec. 20, 2022, 14 pages, retrieved from: <https://en.wikipedia.org/wiki/Virtual_reality>.

"Augmented reality", Wikipedia, last edited Dec. 19, 2022, 37 pages, retrieved from: <https://en.wikipedia.org/wiki/Augmented_reality>.

\* cited by examiner

Rack K004 ○ AVAILABLE

[Audit Location] [Download Cutsheet]

Storekeeper ID:
Platform:
Availability Domain: D-1
Room: 5
Part Number: 4679
Type: rack
Sales Order Number:

Serial:
Region Canonical Name: us
Building Canonical Name: d1
Room Canonical Name: d1
Owner: Compute
Rack Number: 38
Purchase Order Number:

BM Stats

World View / d1 / Rack 38

| Slot | Content |
|---|---|
| 42 | 1664NM642 - CUSTOMERREGULAR.03 |
| 41 | 1664NM646 - CUSTOMERREGULAR.03 |
| 40 | 1664NM64A - CUSTOMERREGULAR.03 |
| 39 | 1664NM648 - CUSTOMERREGULAR.03 |
| 38 | 1664NM647 - CUSTOMERREGULAR.03 |
| 37 | 1664NM649 - CUSTOMERREGULAR.03 |
| 36 | 1664NM643 - CUSTOMERREGULAR.03 |
| 35 | 1664NM642 - CUSTOMERREGULAR.03 |
| 34 | 1664NM641 - CUSTOMERREGULAR.03 |
| 33 | 1664NM64K - CUSTOMERREGULAR.03 |
| 32 | 1664NM64N - CUSTOMERREGULAR.03 |
| 31 | 1664NM64A - CUSTOMERREGULAR.03 |
| 30 | 1664NM645 - CUSTOMERREGULAR.03 |
| 29 | 1664NM64E - CUSTOMERREGULAR.03 |
| 28 | 1664NM64K - CUSTOMERREGULAR.03 |
| 27 | 1664NM64Y - CUSTOMERREGULAR.03 |
| 26 | 1664NM64F - CUSTOMERREGULAR.03 |
| 25 | 1664NM64T - CUSTOMERREGULAR.03 |
| 24 | 018 642 4018 |
| 23 | |
| 22 | 2102 414 0241 |
| 21 | |
| 20 | 1630 136 006 |
| 19 | 1664NM678 - CUSTOMERREGULAR.03 |
| 18 | 1664NM64F - CUSTOMERREGULAR.03 |
| 17 | 1664NM54U - CUSTOMERREGULAR.03 |
| 16 | 1664NM64N - CUSTOMERREGULAR.03 |
| 15 | 1664NM64C - CUSTOMERREGULAR.03 |
| 14 | 1664NM64D - CUSTOMERREGULAR.03 |

Visualization 170

SYSTEM AND METHOD FOR USE OF VIRTUAL OR AUGMENTED REALITY WITH DATA CENTER OPERATIONS OR CLOUD INFRASTRUCTURE

CLAIM OF PRIORITY

This application claims the benefit of priority to U.S. Provisional Patent Application titled "SYSTEM AND METHOD FOR USE OF VIRTUAL OR AUGMENTED REALITY WITH CLOUD INFRASTRUCTURE SERVICES AND DATA CENTER OPERATIONS", Application No. 62/915,422, filed Oct. 15, 2019; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to the management of computer data centers that support cloud computing environments, and are particularly related to the use of virtual reality and/or augmented reality to support data center operations or the management of cloud infrastructure services.

BACKGROUND

Modern computer data centers range in size from smaller data halls or cages, perhaps with a few 100 kW power racks, to larger data centers that would span several football fields, with power requirements in the range of 10's of MW.

As the size, complexity, and scale of data centers grow, the operating, monitoring, maintaining and updating of such data centers requires a significant amount of operator manual intervention around the clock (24×7) throughout the year.

Data center (human) operators, upon notification via alarms, work to identify problem areas, isolate incidents, or perform complex tasks, including repairs and maintenance, oftentimes with limited knowledge about the underlying issues. Resolving the problem may necessitate several long back-and-forth trips by those operators from a home base to impacted areas, including intervening communications with an operations command center, or with subject matter experts who can help with triaging and resolving issues.

As a result, extended outages in data centers, and longer remediation times, are fairly common, and often require the intervention of several teams across geographic boundaries working through tedious runbooks or written process documentation.

Better insight into the underlying issues, and an ability to act upon changes or repair protocols in-situ would be useful in enhancing the operational efficiencies of such data centers or cloud computing environments.

SUMMARY

In accordance with an embodiment, described herein is a system and method for use of virtual reality and/or augmented reality with data center operations and cloud infrastructure services. The approach leverages virtual reality and/or augmented reality, and insights from various sources of data describing the operation of the data center, including data center analytics, for facilitating in-situ diagnostics, operations, monitoring, maintenance, repair, health prognostics, and remote collaboration, toward enhancing the efficiency of managing and running data centers. In accordance with an embodiment, the system can operate with VR/AR devices that can be provided as VR/AR headsets or other devices, that include sensors that measure a data center operator's position, orientation, and movement within a cloud infrastructure or data center environment, and can display a visualization associated with the physical devices of the data center environment, including where appropriate information from other sources useful in performing data center operations.

BRIEF DESCRIPTION OF THE DRAWINGS

FIG. 2 illustrates an example ticket tracking system for use with data center operations, in accordance with an embodiment.

FIG. 12 illustrates another example visualization, in accordance with an embodiment.

DETAILED DESCRIPTION

As described above, as the size, complexity, and scale of data centers grow, the operating, monitoring, maintaining and updating of such data centers requires a significant amount of operator manual intervention around the clock (24×7) throughout the year. Data center (human) operators, upon notification via alarms, work to identify problem areas, isolate incidents, or perform complex tasks, including repairs and maintenance, oftentimes with limited knowledge about the underlying issues. Resolving the problem may necessitate several long back-and-forth trips by those operators from a home base to impacted areas, including intervening communications with an operations command center, or with subject matter experts who can help with triaging and resolving issues.

In accordance with an embodiment, described herein is a system and method for use of virtual reality and/or augmented reality with data center operations and cloud infrastructure services.

The approach leverages virtual reality and/or augmented reality, and insights from various sources of data describing the operation of the data center, including data center analytics, for facilitating in-situ diagnostics, operations, monitoring, maintenance, repair, health prognostics, and remote collaboration, toward enhancing the efficiency of managing and running data centers.

In accordance with an embodiment, the system can operate with VR/AR devices that can be provided as VR/AR headsets or other devices, that include sensors that measure a data center operator's position, orientation, and movement within a cloud infrastructure or data center environment, and can display a visualization associated with the physical devices of the data center environment, including where appropriate information from other sources useful in performing data center operations.

Introduction to Data Centers, Layouts, and Lifecycles

Cloud infrastructure service providers, for example Oracle Corporation, build and operate data centers in different geographic regions worldwide. An important function of such cloud infrastructure service providers is to maximize the accessibility and availability of infrastructure resources to customers, such as, for example, the number of server cores that are available and active, the amount of data storage that is available and/or filled, and network physical and virtual connectivity to the data centers providing low-latency accessibility to data and software applications.

These considerations are often measured by service level agreements (SLA) requiring, for example, 99.9% availability, or a permissible downtime per year that may be measured in minutes.

Figure 1:
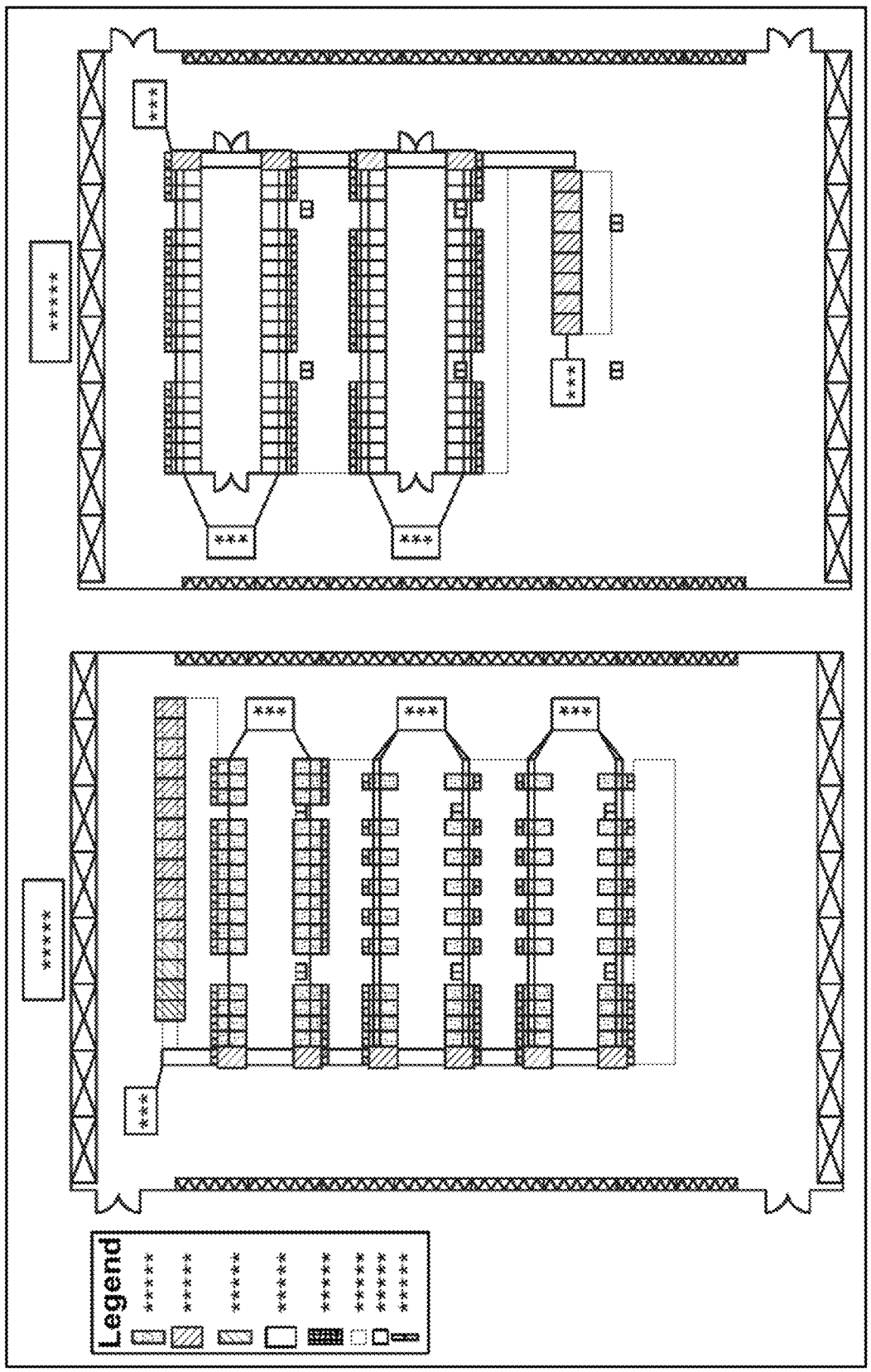
FIG. 1 illustrates an example representation of a physical layout of a data center, in accordance with an embodiment.

FIG. 1 illustrates an example representation of a physical layout of a data center, in accordance with an embodiment.

As illustrated in FIG. 1, within a typical cloud infrastructure or data center environment, physical computer resources are tightly organized in rows and columns of racks in data halls. Racks are arranged in rows and columns and have inter-rack and intra-rack cabling infrastructure. In addition, power distribution units (PDU), breakers, air handlers, and cooling units are often part of the physical layout.

Racks containing compute servers, storage, database machines, switches, networking equipment and are generally interconnected with a variety of different inter-rack cables (for example, direct attach copper (DAC) and optical cables), as well as structured fiber intra-rack cable types, and also power delivery units to the racks.

A typical large data center may hold thousands of racks, with each rack holding 42 rack units (as an example). Typical power to each rack is max rated at either 15 kVA or 24 kVA. Tens of thousands, to hundreds of thousands of server and storage units, and tens of thousands of switches are not uncommon in a typical data center. On top of this, the number of intra- and inter-rack cables and data ports scale proportionally by a factor of about 30 to 100. Each switch may have over 50 interfaces. Each interface may have 10-100 or more Object Identifier (OID) strings. Information is therefore available from hundreds of millions of such strings within the data center. The complexity and scale at the individual rack and device level is substantial.

At these scales, hardware and software failures are fairly common. To ensure high availability, the data centers are architected to be highly resilient with both hardware and software redundancy. Hardware failure rates at the field replaceable unit (FRU) level can happen at the rate between 1-in-1000 to 1-in-10,000 per day. Due to the very high volume of the number of FRU's deployed within each rack, this can translate to several racks impacted per day in the data centers requiring on-site attention to minimize down times.

Running efficient data centers require the continuous monitoring of sensor information that track in real-time (or near-real-time) the health of every single racks and constituent elements within those racks. Information can be retrieved via a pull model (such as using SNMP or API) or via a push model using streaming telemetry. Data center infrastructure management tools, including custom-built environments, help with both SNMP and streaming telemetry. Such tools provide a holistic view of data centers at a very granular level. Operations command centers can then rely on this data and use several dashboards to monitor, assess, and act on information, for example through the use of a ticket tracking system.

Figure 2:
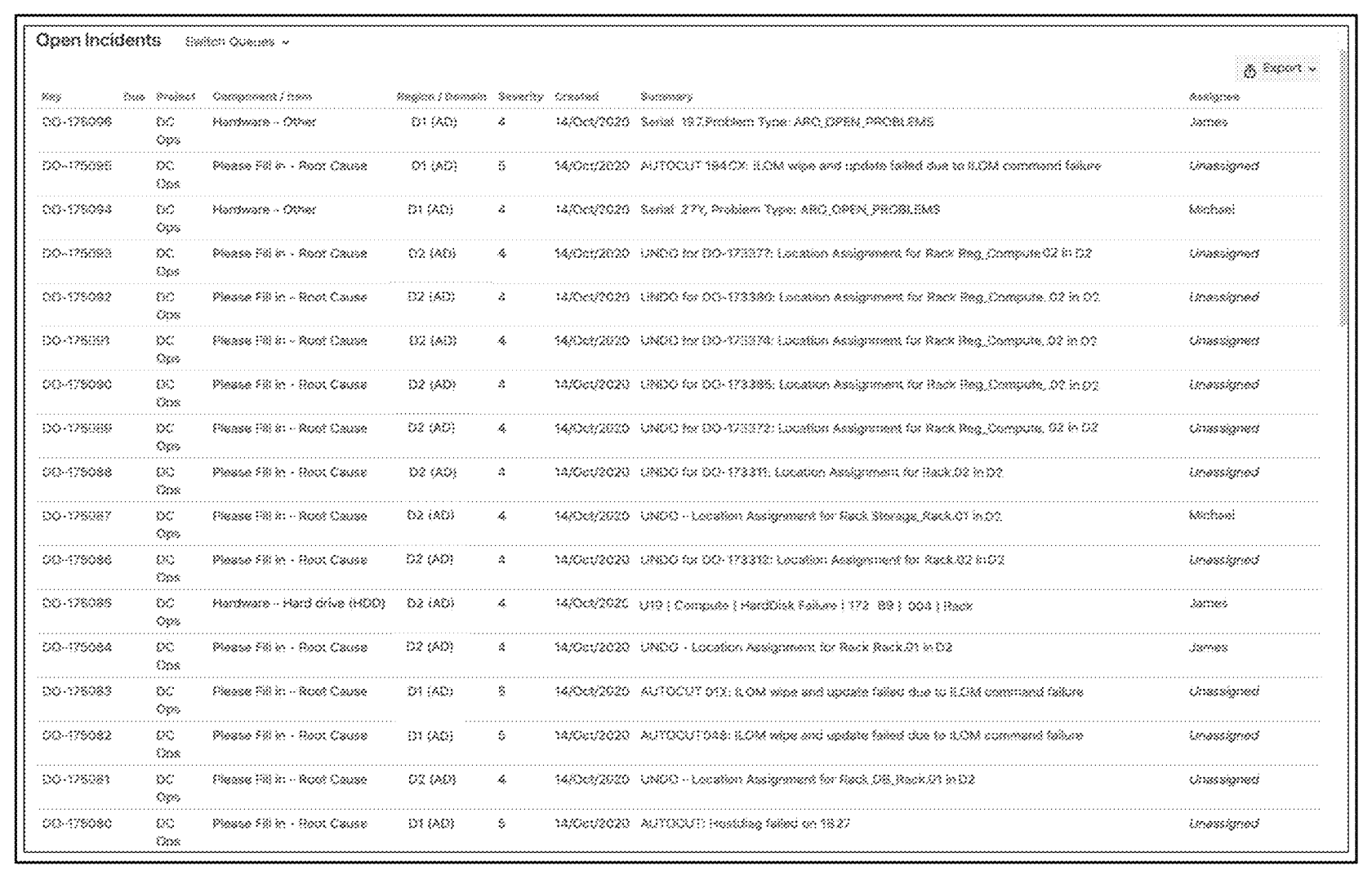

FIG. 2 illustrates an example ticket tracking system for use with data center operations, in accordance with an embodiment.

As illustrated in FIG. 2, whenever issues are detected, data center operators are notified via alerts, in response to which they may walk back and forth multiple times, to the impacted column and row in the data hall, and identify the racks and corresponding servers or other equipment and follow necessary runbooks for triage, isolation, repairs, maintenance, decommissioning and/or commissioning steps as required. Data center operators may spend a significant portion of their daily time on resolving such issues.

Figure 3:
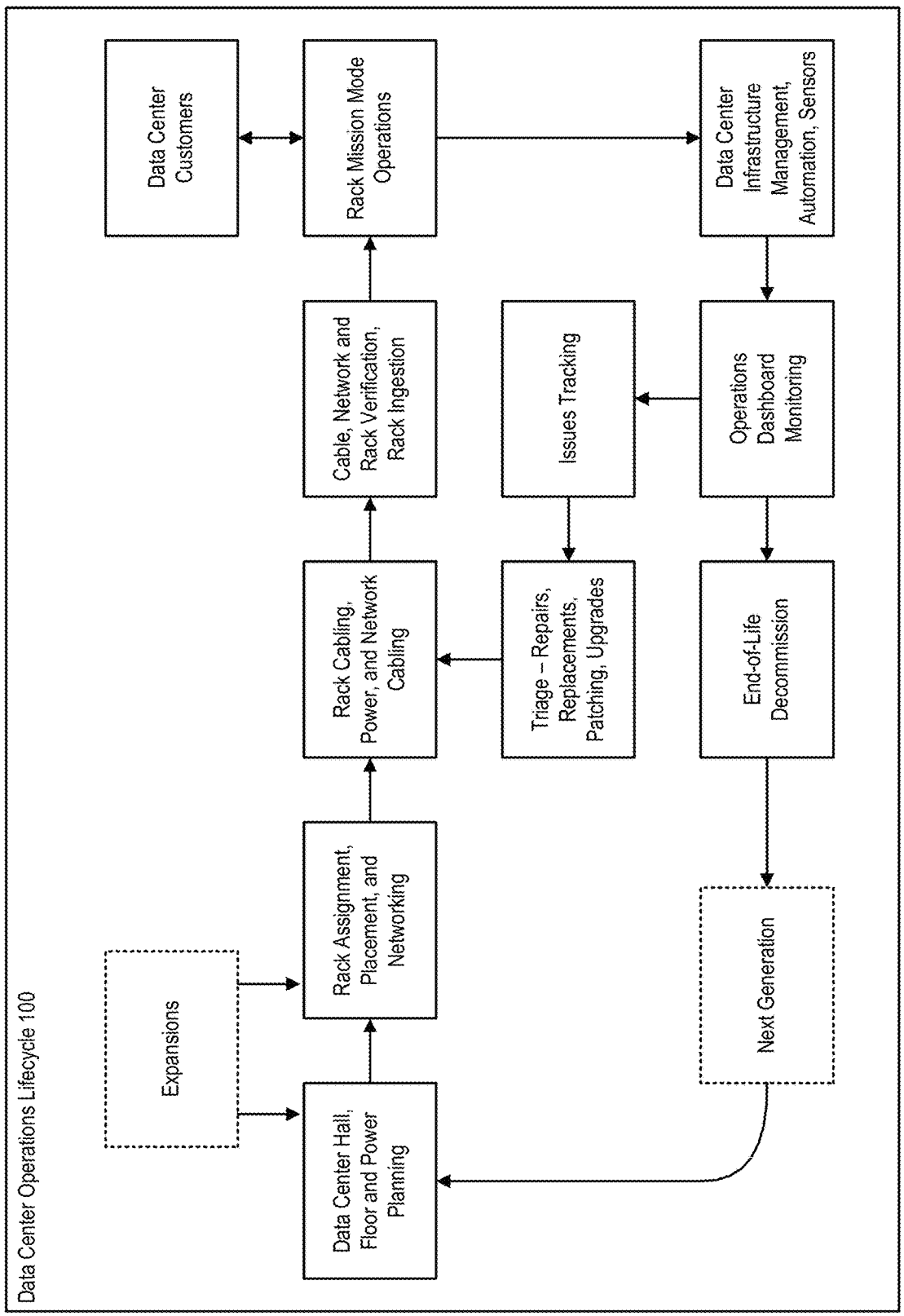
FIG. 3 illustrates an example of a typical data center operation lifecycle, in accordance with an embodiment.

FIG. 3 illustrates an example of a typical data center operation lifecycle, in accordance with an embodiment.

As illustrated in FIG. 3, operator involvement in such tasks flow through the entire lifecycle 100, from data center installation and bring-up, to daily operations until end-of-life.

Due to the scale and volume of equipment they handle daily—while physically moving back and forth several times from office to warehouse to data center halls while transporting equipment for repairs, replacement or maintenance—highly precise operator touch is required. A substantial amount of time is spent in analyzing data (away from problem areas) and then locating problem areas. There are opportunities for missteps, which compound the issues and further increase outage times. Additionally, there is a significant amount of manual touch in all these steps.

As data centers start automating steps to address the above, it is desirable to provide individual operators with additional information that aids and improves daily operational efficiency all around.

Virtual and Augmented Reality

Generally described, virtual reality (VR) provides a simulated experience which can either resemble, or be completely different from, the real/physical world.

A virtual reality system can use devices such as wearable VR/AR headsets incorporating display screens to generate images and sounds that simulate a user's physical presence in a virtual environment. A person using virtual reality equipment is able to move around the virtual environment, and interact with virtual objects or features within that environment.

Generally described, augmented reality (AR) provides a form of virtual reality that supplements the information the user sees in a real/physical environment with additional computer-generated content.

An augmented reality system can use devices such as VR/AR headsets to generate images that augment the user's perception of the real/physical environment, for example, by layering computer-generated data or information over a display of the real/physical environment. To accomplish this, augmented reality systems generally perform a registration of the displayed computer-generated data or information with actual coordinates of the real/physical environment.

In accordance with various embodiments, VR/AR devices can include Global Positioning System (GPS) sensors, accelerometers, or other sensors that measure the user's position, orientation, and movement within the real/physical environment, and can be provided, for example, as VR/AR headsets as described above. In accordance with various other embodiments, other types of VR/AR computer devices can be used, such as, for example, Oculus, Magic Leap, HoloLens, VR glasses, hand-held or wearable computers, tablet or pad-like computer devices, or smart phones.

VR/AR with Data Centers/Cloud Infrastructure Services

In accordance with an embodiment, the approach described herein leverages virtual reality and/or augmented reality, and insights from various sources of data describing the operation of the data center, including data center analytics, for facilitating in-situ diagnostics, operations, monitoring, maintenance, repair, health prognostics, and remote collaboration, toward enhancing the efficiency of managing and running data centers.

In accordance with an embodiment, the system can operate with VR/AR devices that can be provided as VR/AR headsets or other devices, that include sensors that measure a data center operator's position, orientation, and movement within a cloud infrastructure or data center environment, and can display a visualization associated with the physical devices of the data center environment, including where appropriate information from other sources useful in performing data center operations.

Figure 4:
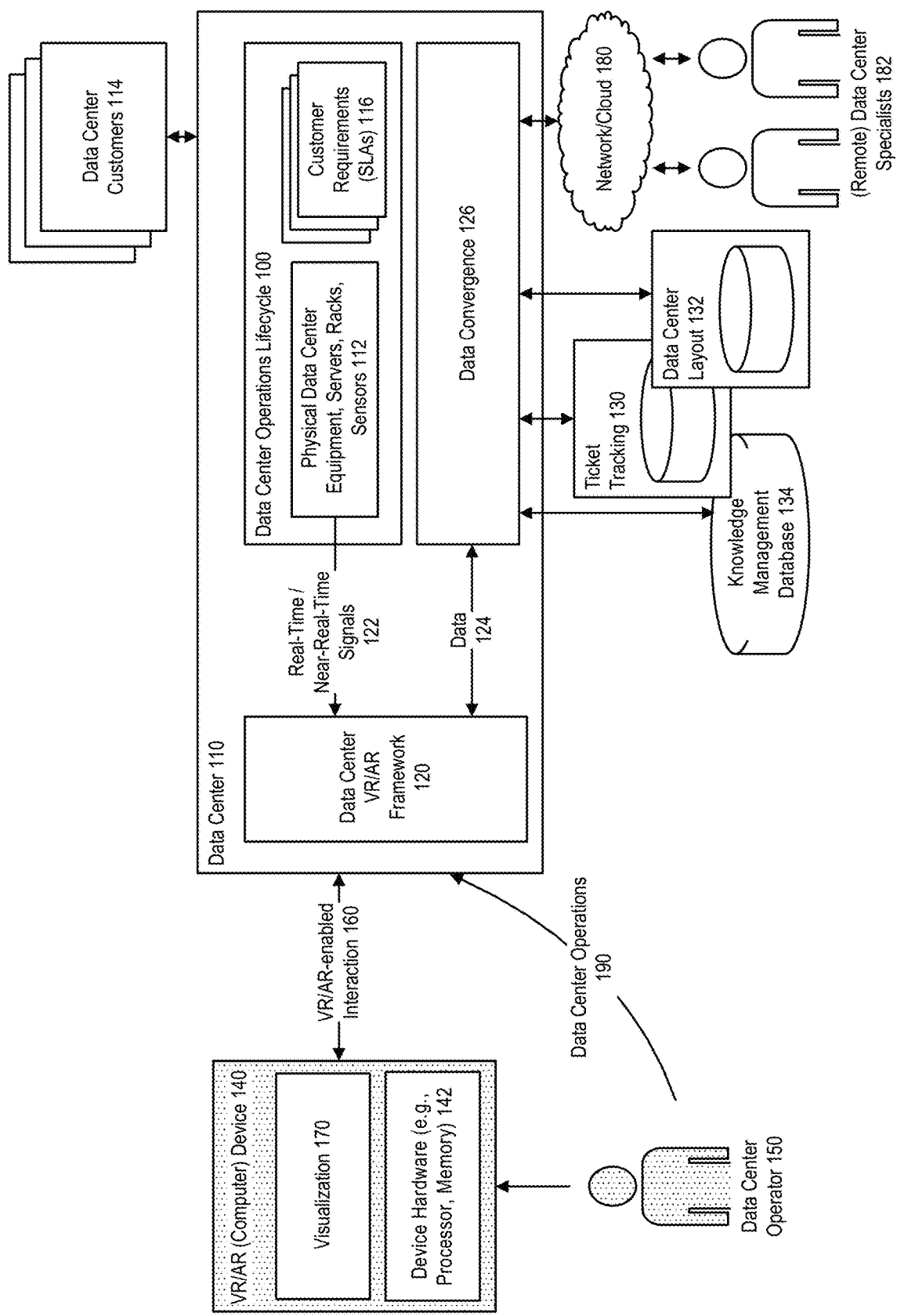
FIG. 4 illustrates an example system for use of virtual reality and/or augmented reality with data center operations and cloud infrastructure services, in accordance with an embodiment.

FIG. 4 illustrates an example system for use of virtual reality and/or augmented reality with data center operations and cloud infrastructure services, in accordance with an embodiment.

As illustrated in FIG. 4, in accordance with an embodiment, a data center 110 or cloud infrastructure services environment, can include physical data center equipment, servers, racks, sensors, or other devices 112; that are accessible to data center customers 114, who may be associated with customer requirements, or service level agreements 116.

In accordance with an embodiment, the data center can include a VR/AR framework 120 that enables the use of virtual reality and/or augmented reality with data center operations and cloud infrastructure services.

In accordance with an embodiment, the VR/AR framework can receive real-time (or near-real-time) signals 122, metrics, analytics, or other data, from or associated with the physical data center equipment, servers, racks, sensors, or other devices, and other information or data 124 via a data convergence layer or component 126.

In accordance with an embodiment, examples of sources for the other information or data can include, for example, a ticket tracking system (database) 130, a data center layout (database) 132, or a knowledge management database 134.

In accordance with an embodiment, the system can be accessed via a VR/AR (computer) device 140, which can be provided as a VR/AR headset as described above, that includes a device hardware 142 (e.g., processor, memory) and sensors that measure the position, orientation, and movement of a data center operator 150 within a real/physical environment, for example a cloud infrastructure or data center environment.

In accordance with an embodiment, as the data center operator works within the cloud infrastructure or data center environment, using VR/AR-enabled interaction 160, the VR/AR (computer) device can communicate with the data center VR/AR framework, and display a visualization 170 associated with the physical devices of the cloud infrastructure or data center environment.

For example, in accordance with an embodiment, the visualization can include or be overlaid upon a displayed elevation of the rack, blade, slot, or other data center device to be examined, which acts as a safeguard to working on the wrong rack/blade.

In accordance with an embodiment, the device can display a map of the data center, together with information provided in the line of vision of the data center operator, so that they do not have to look at multiple screens for that information.

In accordance with an embodiment, the data convergence layer or component also enables data to be communicated between the data center and other locations, via for example a network/cloud 180, for example to communicate information to and/or receive assistance from one or more (remote) data center specialists 182.

In accordance with an embodiment, the system enables data center operations 190 by the data center operator, including for example facilitating in-situ diagnostics, operations, monitoring, maintenance, repair, health prognostics, and remote collaboration.

In accordance with an embodiment, the system operates as a converged system, and can utilize an event-driven model that operates in a dynamic manner. For example, the information displayed can be updated in real-time or near-real-time to reflect what the data center operator is actually seeing.

In accordance with an embodiment, the information can include data center related analytics, for example, describing which are the problems that have occurred with a particular data center component; whether there has been a temperature rise, or what else has happened.

In accordance with an embodiment, information can be gathered from multiple other systems or sources, and then filtered or otherwise processed to exclude information that isn't needed, and provide focused information for the data center operator.

In accordance with an embodiment, the system can leverage additional sources of information such as knowledge management articles, and can improve the utility of the data center analytics over time.

In accordance with an embodiment, the system can utilize artificial intelligence (AI) models to determine analytics and insights to provide the focus for the data center operator.

In accordance with an embodiment, the VR/AR framework can be made extensible, for example to snap-in various device telemetry drivers.

In accordance with an embodiment, each data center process may have an associated SLA with how fast a particular problem should be fixed. In such an example, a data center team may need to modify the data center to support a particular SLA, e.g., a data center technician wearing VR glasses may be signaled that a particular rack could be functioning improperly and about to cause an SLA to be missed, and then operate accordingly. Such a scenario could be associated with an appropriate visualization alerting of that condition (e.g., a depiction of flames).

Figure 5:
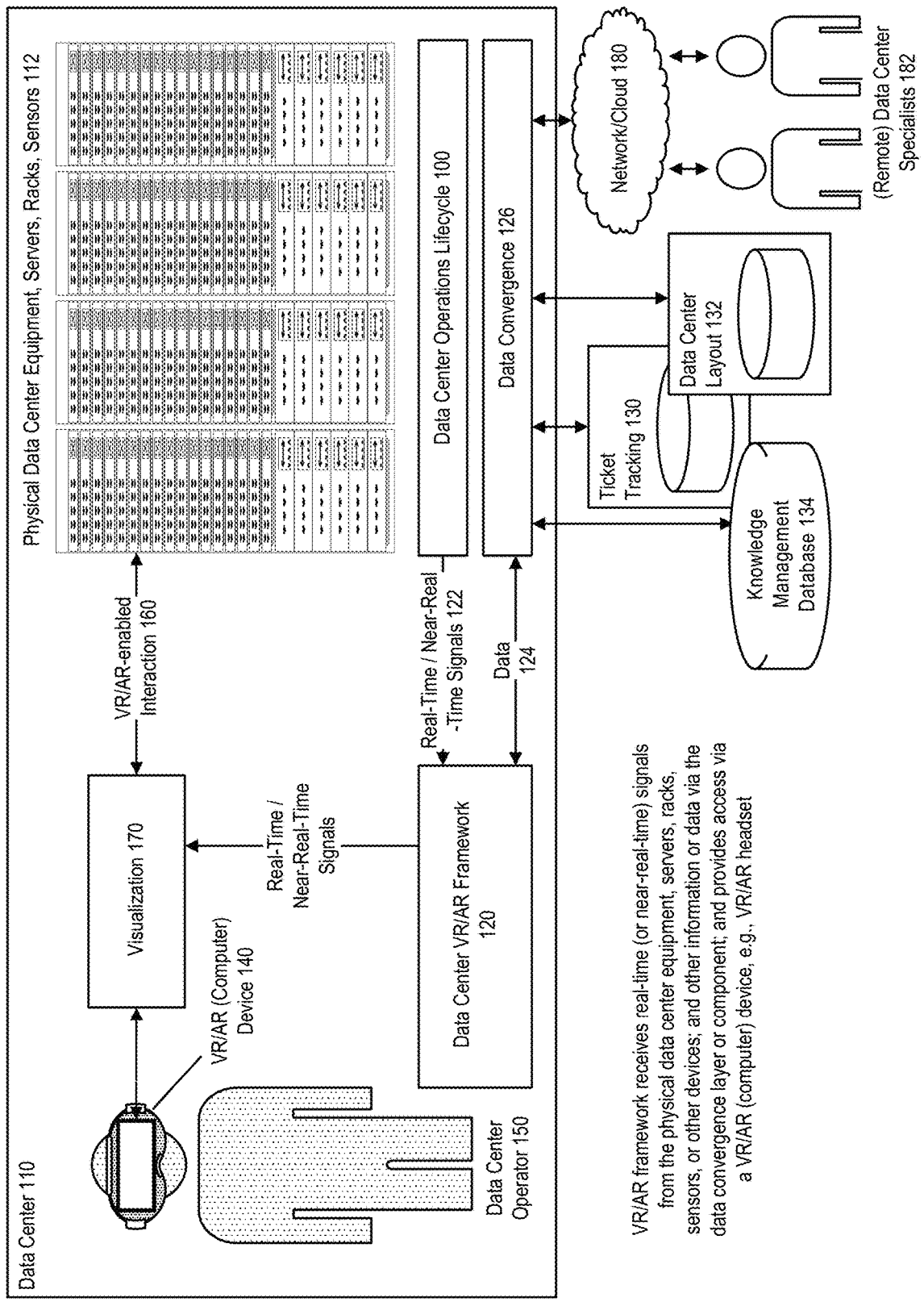
FIG. 5 further illustrates an example system for use of virtual reality and/or augmented reality with data center operations and cloud infrastructure services, in accordance with an embodiment.

FIG. 5 further illustrates an example system for use of virtual reality and/or augmented reality with data center operations and cloud infrastructure services, in accordance with an embodiment.

As illustrated in FIG. 5, in accordance with an embodiment, the VR/AR framework can receive real-time (or near-real-time) signals, metrics, analytics, or other data, from or associated with the physical data center equipment, servers, racks, sensors, or other devices, and other information or data via the data convergence layer or component. The system can be accessed via the VR/AR (computer) device, e.g., VR/AR headset that includes sensors that measure the position, orientation, and movement of a data center operator within the data center environment.

Figure 6:
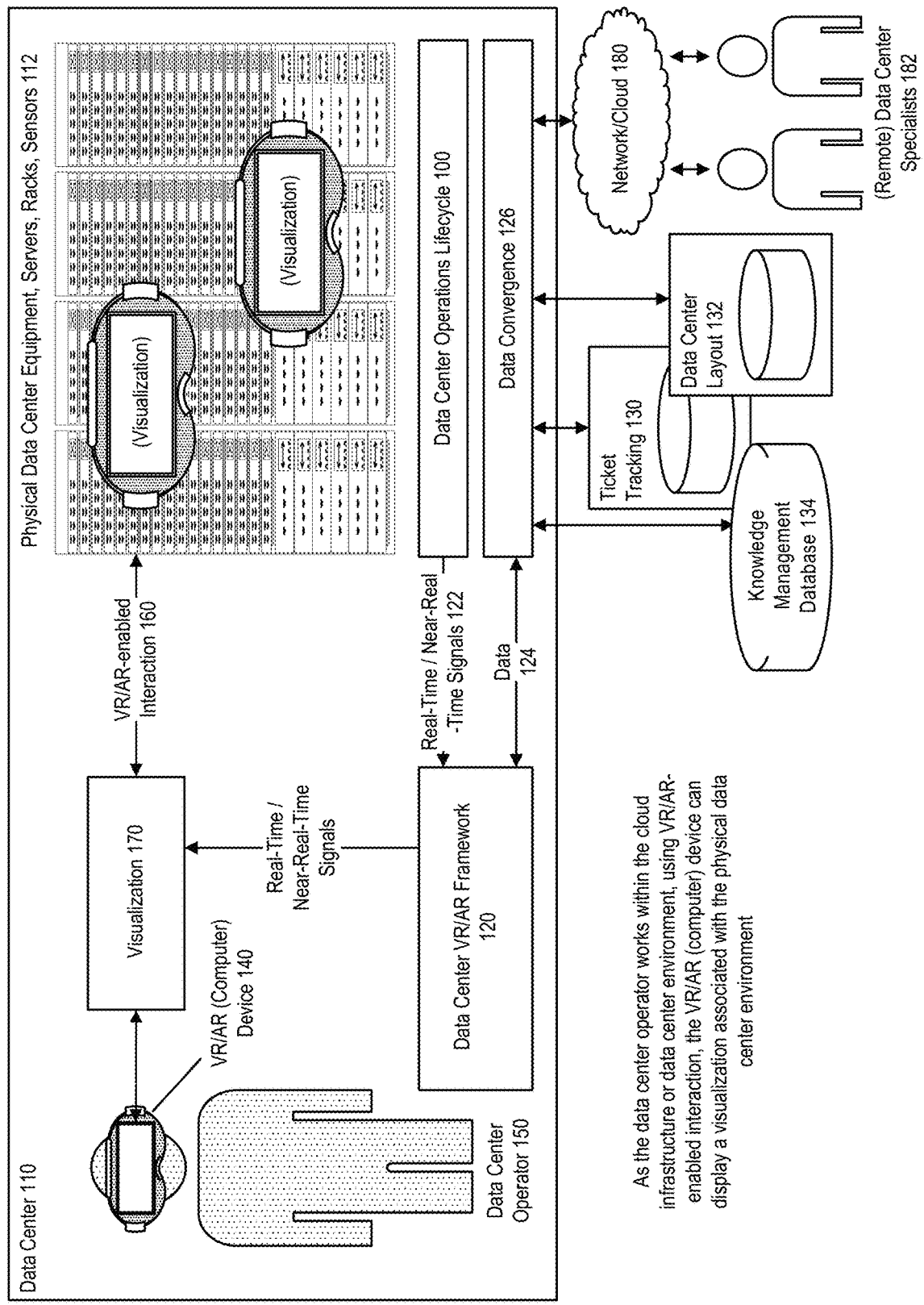
FIG. 6 further illustrates an example system for use of virtual reality and/or augmented reality with data center operations and cloud infrastructure services, in accordance with an embodiment.

FIG. 6 further illustrates an example system for use of virtual reality and/or augmented reality with data center operations and cloud infrastructure services, in accordance with an embodiment.

As illustrated in FIG. 6, in accordance with an embodiment, as the data center operator works within the cloud infrastructure or data center environment, using VR/AR-enabled interaction, the VR/AR (computer) device can display a visualization associated with the physical data center environment.

Figure 7:
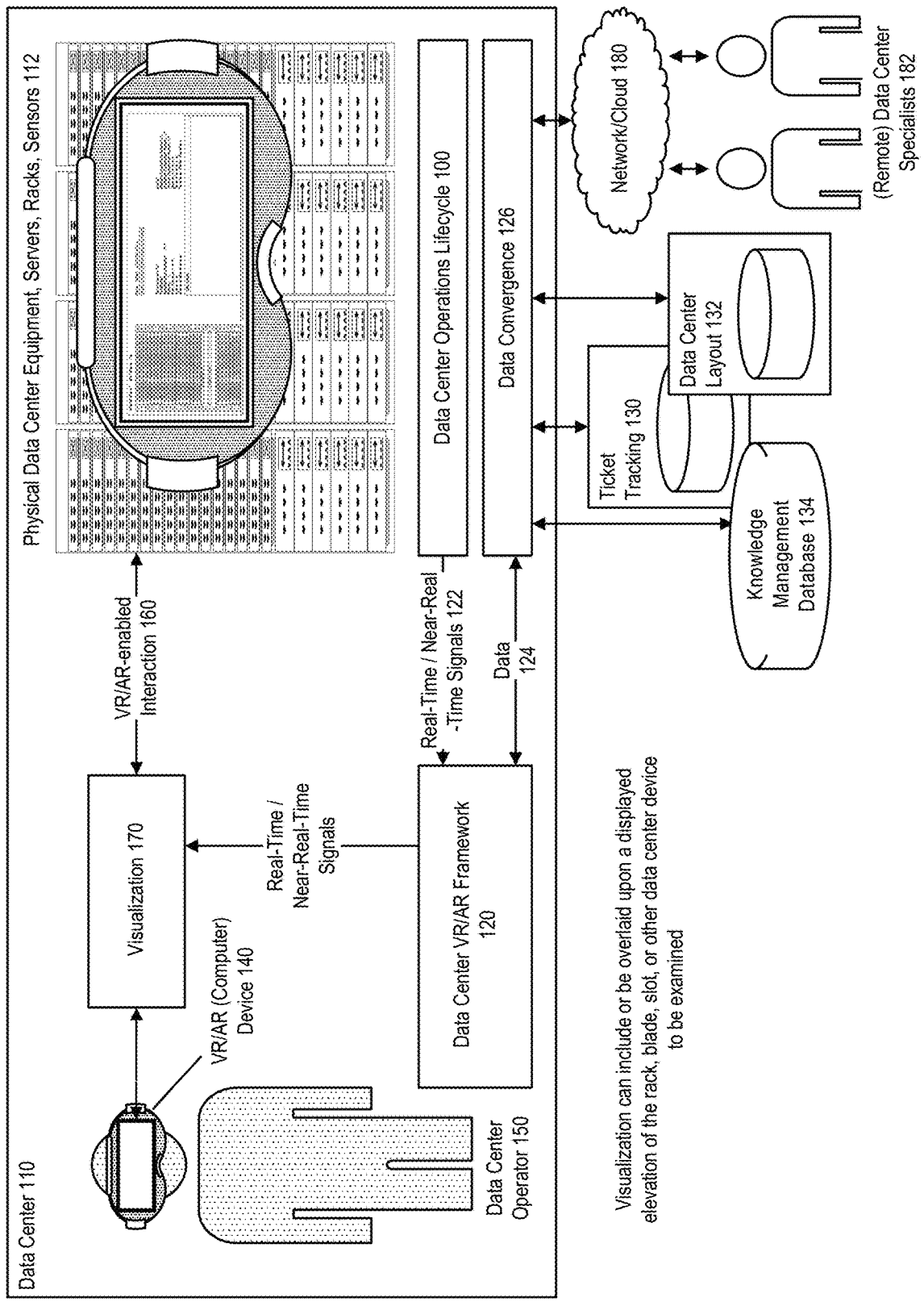
FIG. 7 further illustrates an example system for use of virtual reality and/or augmented reality with data center operations and cloud infrastructure services, in accordance with an embodiment.

FIG. 7 further illustrates an example system for use of virtual reality and/or augmented reality with data center operations and cloud infrastructure services, in accordance with an embodiment.

As illustrated in FIG. 7, in accordance with an embodiment, the visualization can include or be overlaid upon a displayed elevation of the rack, blade, slot, or other data center device to be examined.

Figure 8:
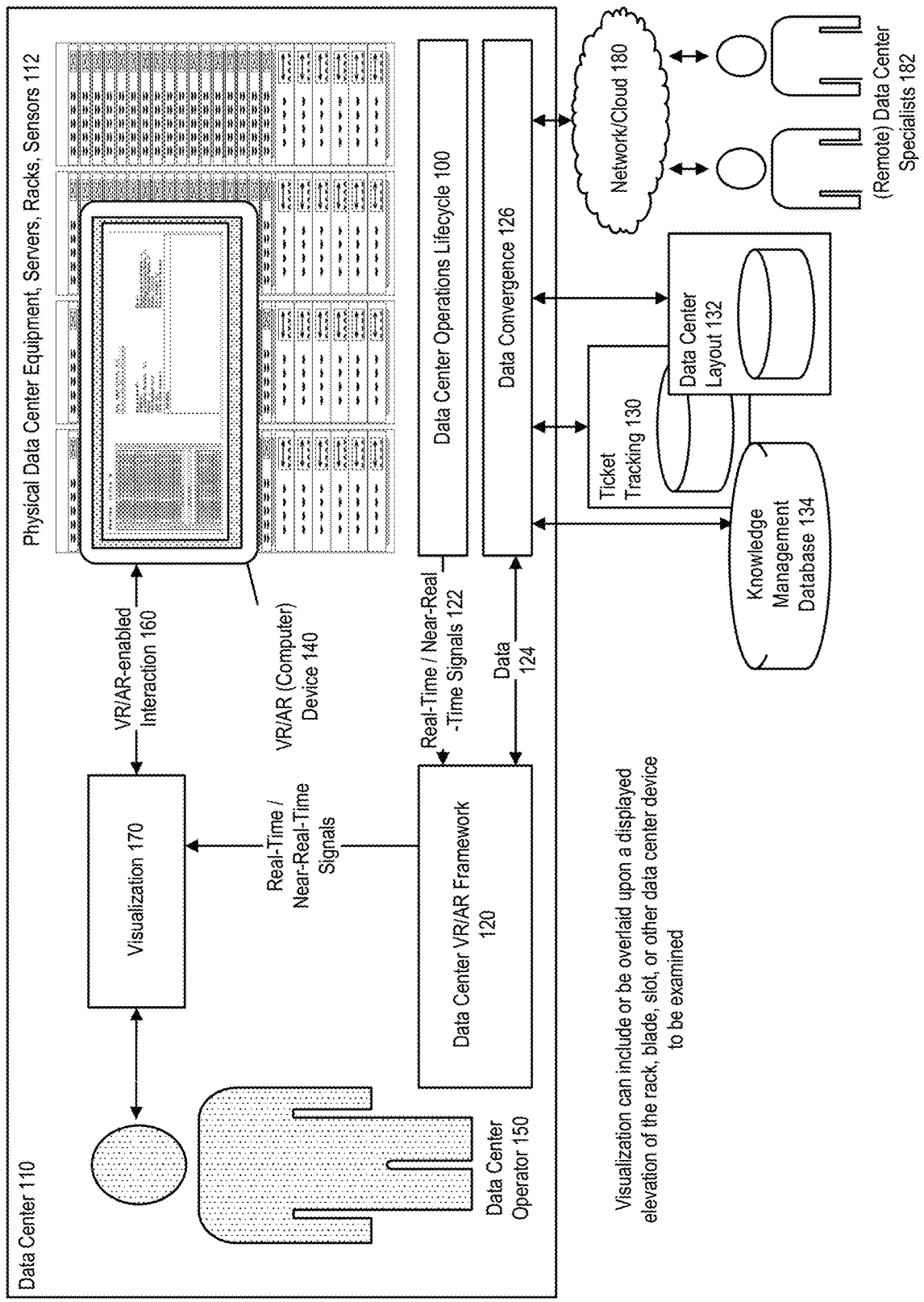
FIG. 8 further illustrates an example system for use of virtual reality and/or augmented reality with data center operations and cloud infrastructure services, in accordance with an embodiment.

FIG. 8 further illustrates an example system for use of virtual reality and/or augmented reality with data center operations and cloud infrastructure services, in accordance with an embodiment.

As illustrated in FIG. 8, in accordance with various embodiments, other types of VR/AR computer devices can be used, such as, for example, tablet or pad-like computer devices, or smart phones, wherein the visualization can include or be overlaid upon a displayed elevation of the rack, blade, slot, or other data center device to be examined.

Figure 9:
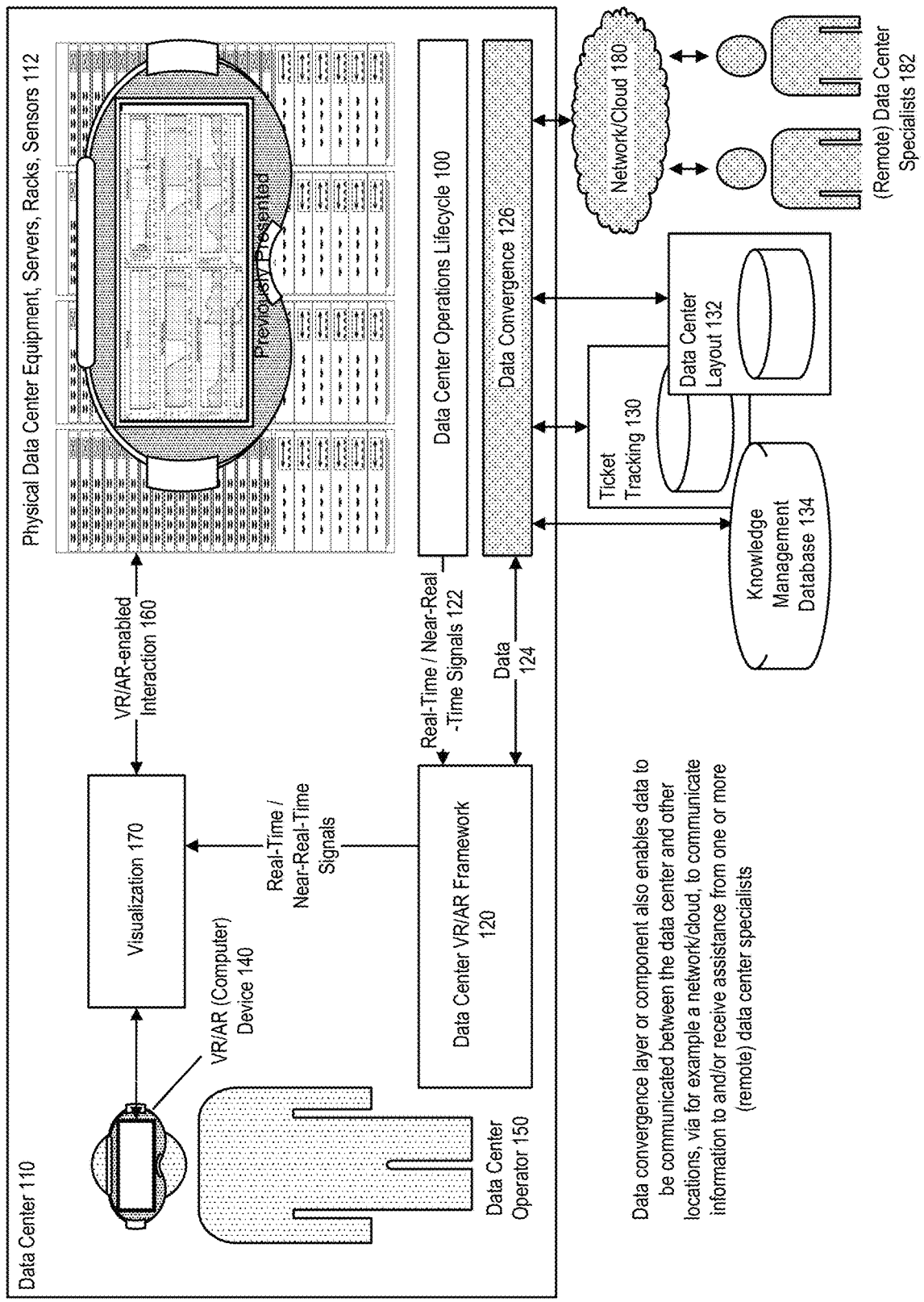
FIG. 9 further illustrates an example system for use of virtual reality and/or augmented reality with data center operations and cloud infrastructure services, in accordance with an embodiment.
Figure 10:
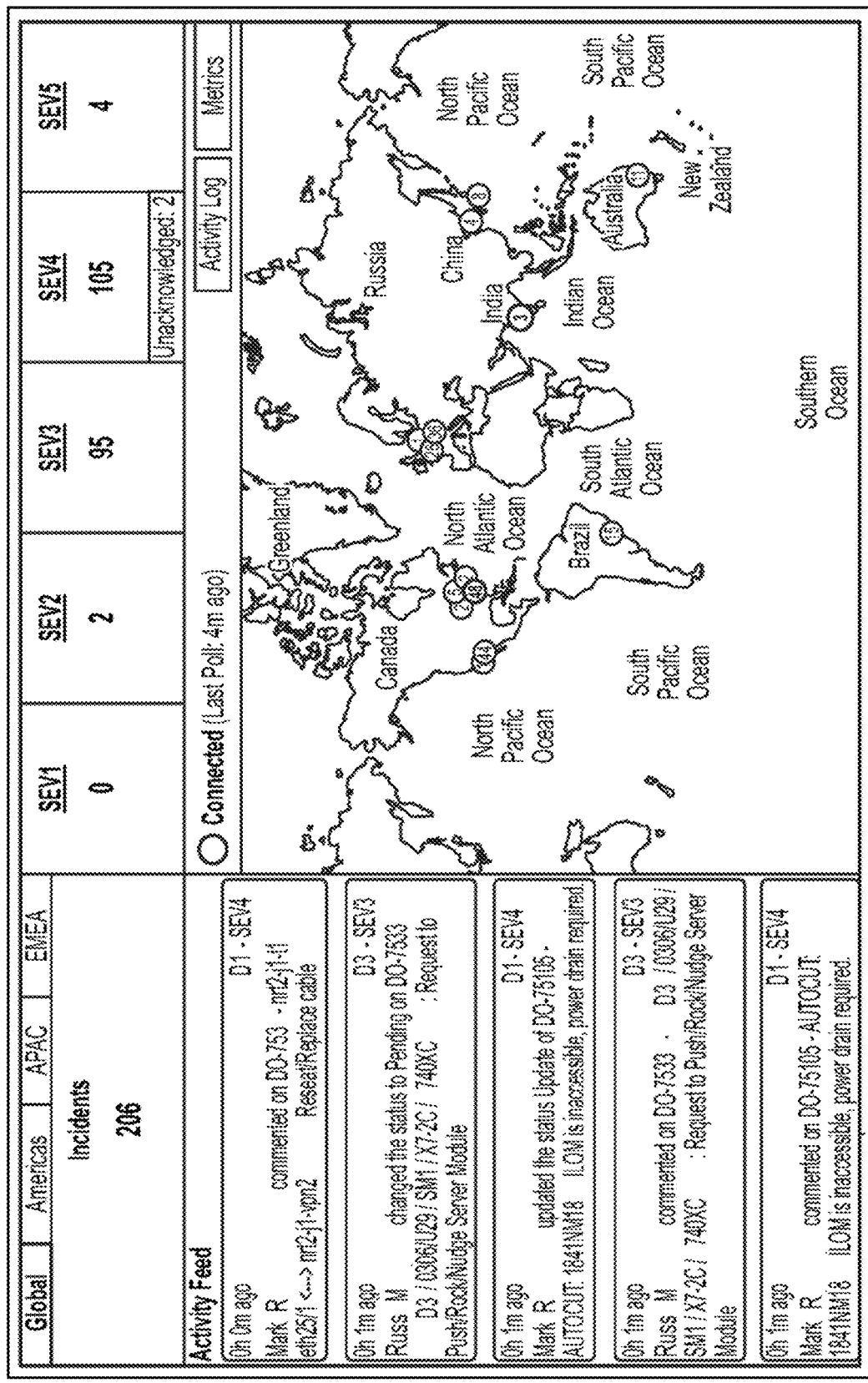
FIG. 10 illustrates an example visualization provided by the use of virtual reality and/or augmented reality with data center operations and cloud infrastructure services, in accordance with an embodiment.
Figure 11:
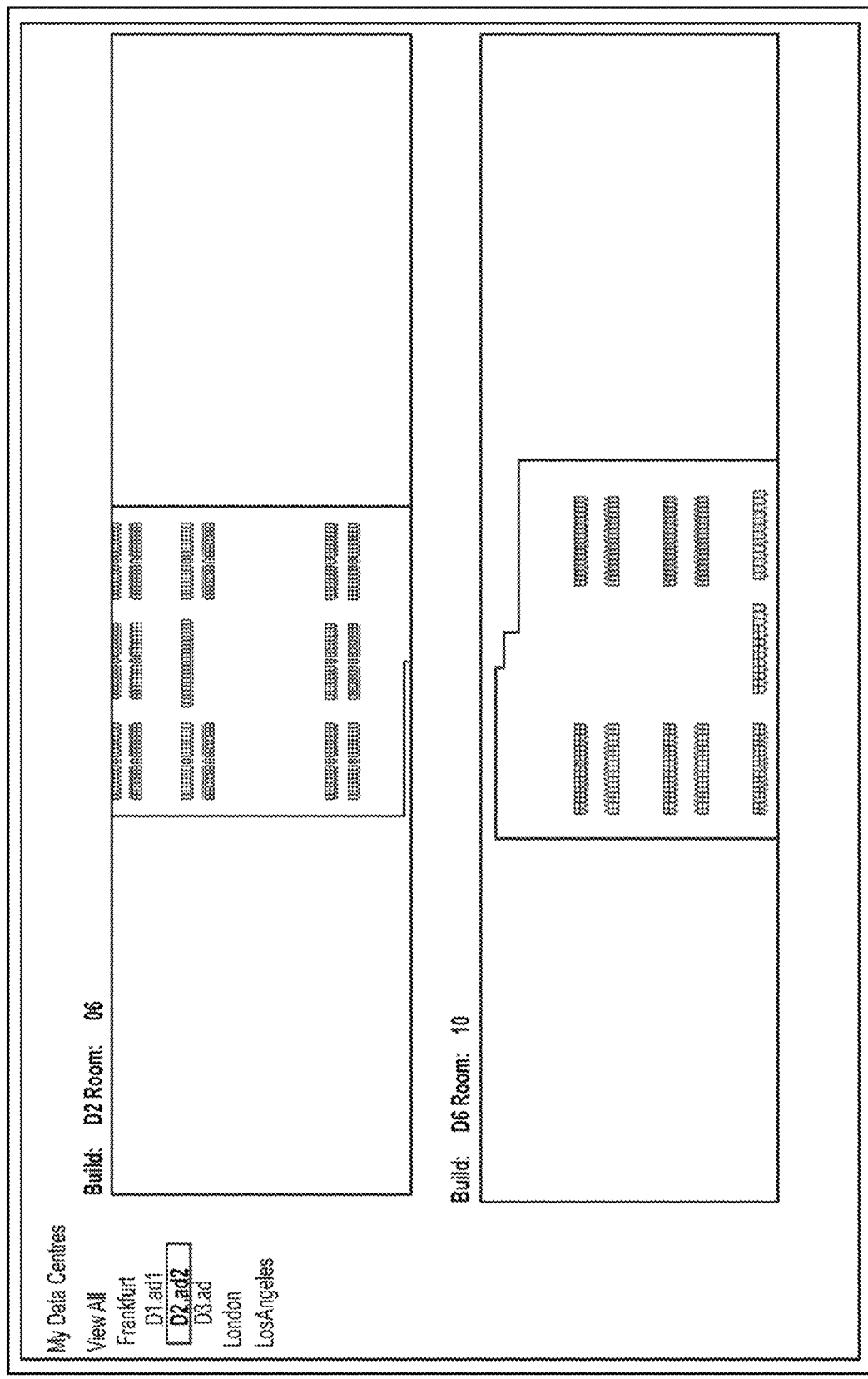
FIG. 11 illustrates another example visualization, in accordance with an embodiment.
Figure 13:
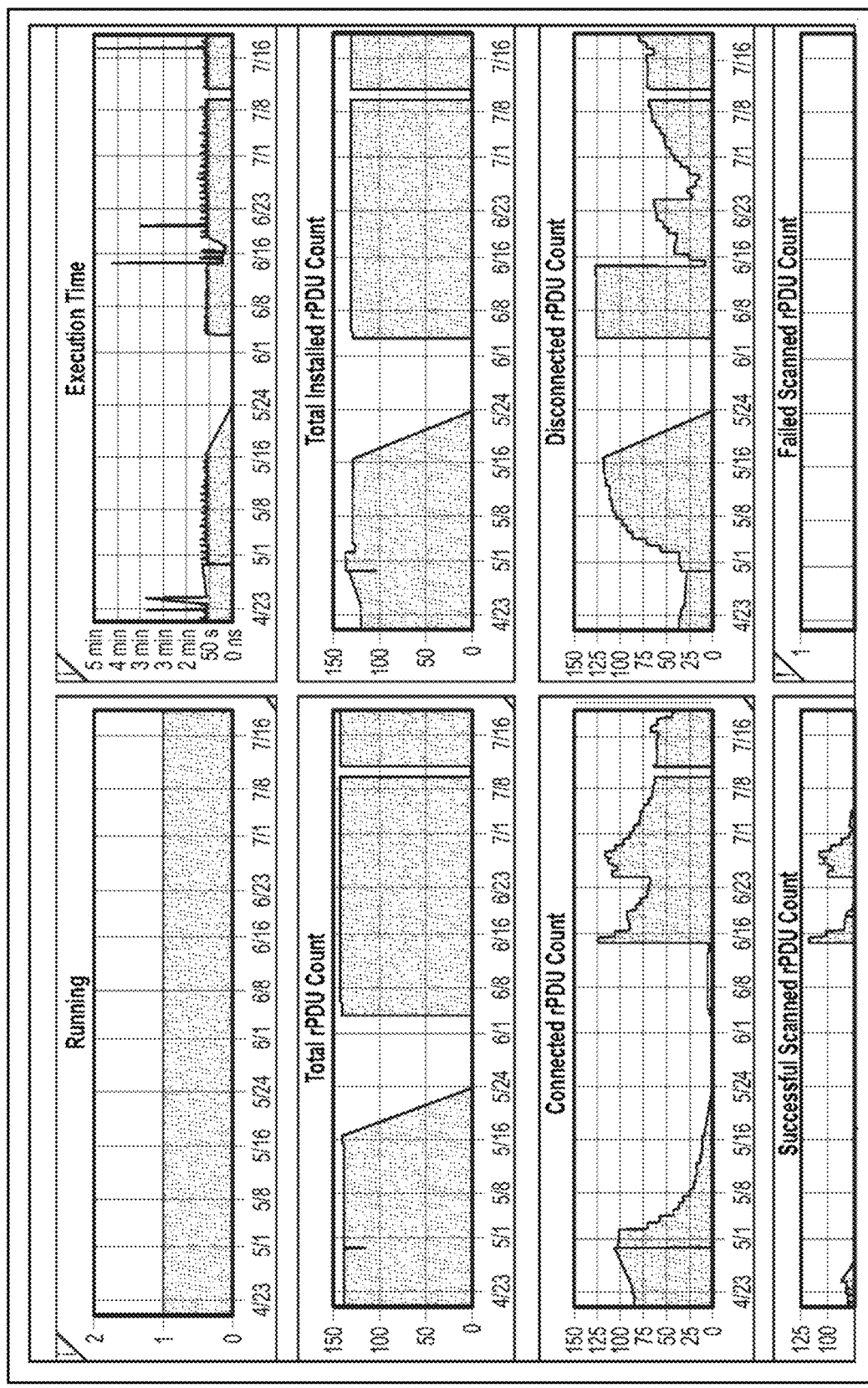
FIG. 13 illustrates another example visualization, in accordance with an embodiment.

FIG. 9 further illustrates an example system for use of virtual reality and/or augmented reality with data center operations and cloud infrastructure services, in accordance with an embodiment.

As illustrated in FIG. 9, in accordance with an embodiment, the data convergence layer or component also enables data to be communicated between the data center and other locations, via for example a network/cloud, to communicate information to and/or receive assistance from one or more (remote) data center specialists.

Example Visualizations

FIGS. 10-13 illustrate example visualizations provided by the use of virtual reality and/or augmented reality with data center operations and cloud infrastructure services, in accordance with an embodiment.

Use of VRAR with Data Center Operations

In accordance with an embodiment, the addition of VR/AR features can be used to enhance the efficiency and productivity of data center operators. For example, each data center operator can be equipped with a VR/AR device, to use on data center premises, especially when away from the data center office home base.

In accordance with an embodiment, by adding VR and AR features in a data center, each and every operator can have instantaneous access to many attributes in their data center operational space which can then be manipulated.

For example, in accordance with an embodiment, these can include, for each region and availability domain (AD), building specific details, such as the physical layout; the halls; cages; columns and rows with different rack SKU's; rack elevations; rack equipment and ports; fiber trunks, optical and copper cables connected, management port interfaces; meet me room location and ports, cross connects and physical ports mapped, fiber entry diversity, Autonet/cut-sheets/identifiers; floor PDUs/rPDUs; IP addresses; make/model/location of air handlers, chillers, pumps, humidifiers, lighting, UPS, breakers and redundancy.

In accordance with an embodiment, by providing this repository of information available on demand through a VR/AR-capable device provides the data center operators with all the information and tools needed for the immersive intervention needed for upkeep, troubleshooting and maintenance literally at their fingertips.

In accordance with an embodiment, the use of a VR/AR device provides extra dimensions to the data center operator and obviates the need for the data center operator to make long back- and forth-trips to the home base. For example, VR/AR feature allow the data center operators to overlay physical information with virtual information and not only act on those information in-situ but also do it in a continuous operating mode. They will no longer be operating in an alerts only based interrupt driven mode.

Figure 14:
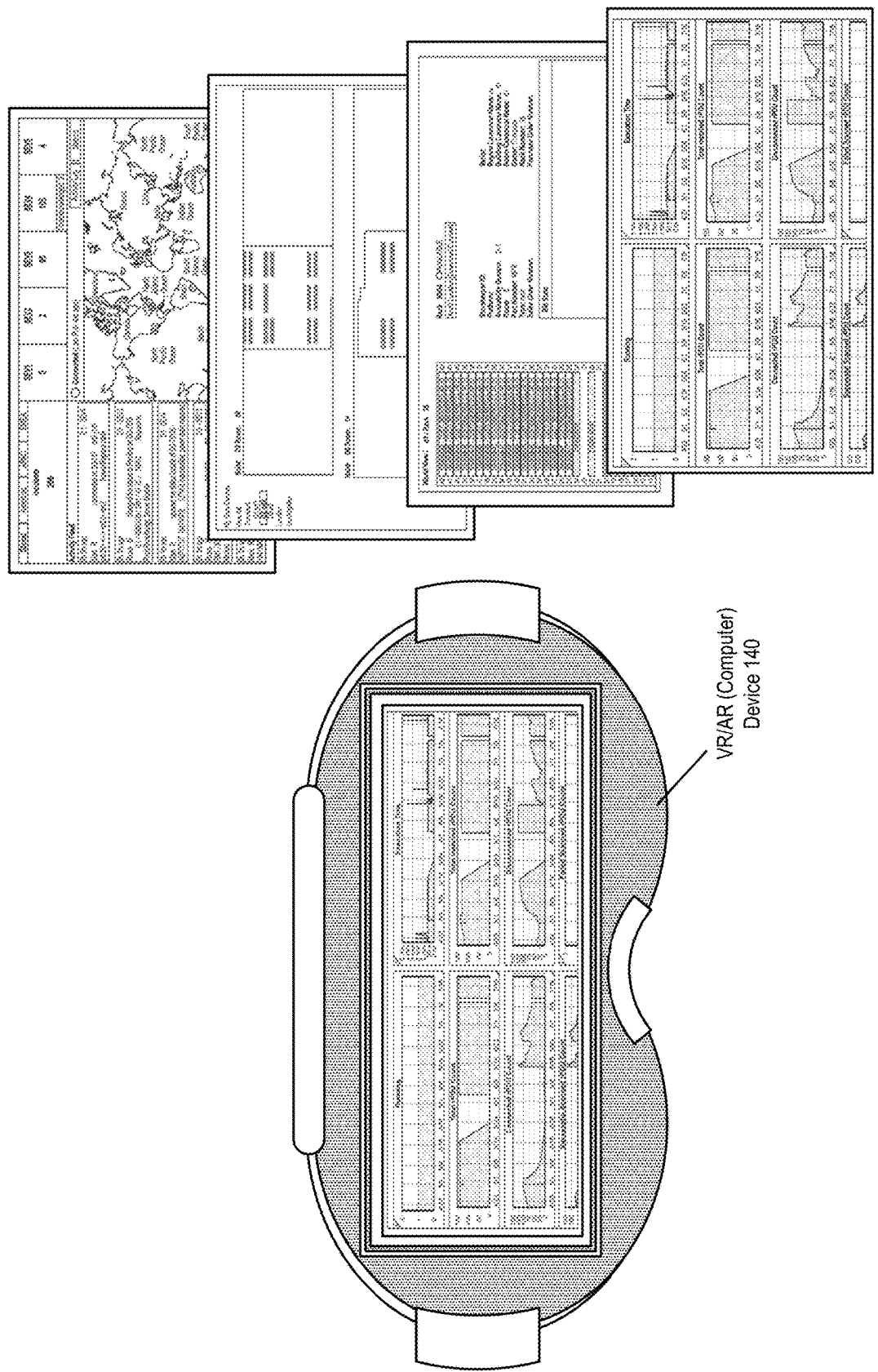
FIG. 14 illustrates examples of devices such as VR/AR (computer) devices, which can be provided as a VR/AR headset, tablet, mobile, phone, or other types of devices, in accordance with an embodiment.

FIG. 14 illustrates an example of a VR/AR (computer) device, which can be provided as a VR/AR headset, in accordance with an embodiment.

As illustrated in FIG. 14, in accordance with an embodiment, the VR/AR (computer) device can display one or more, or a plurality of visualizations associated with the physical devices of the cloud infrastructure or data center environment.

Figure 15:
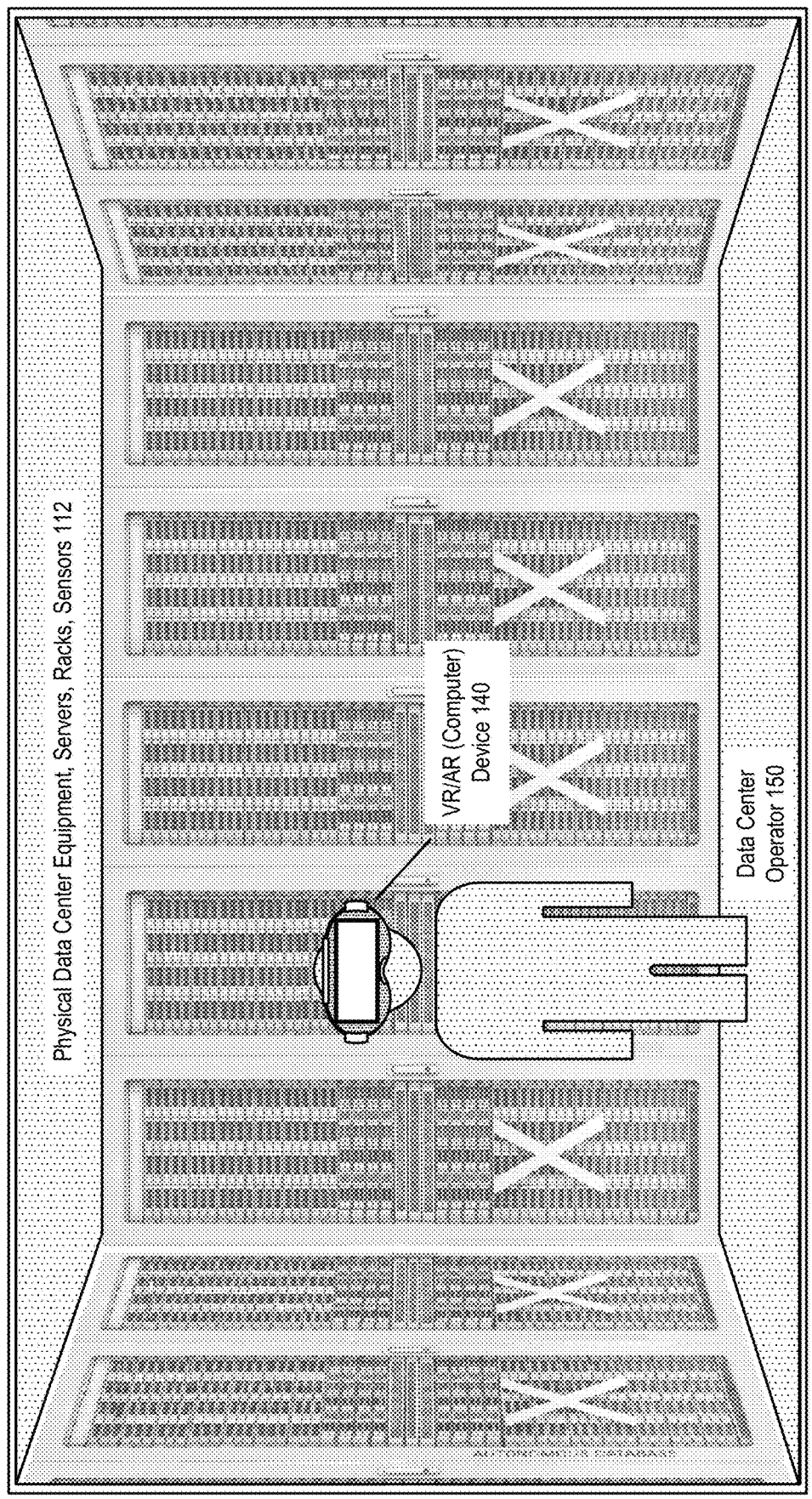
FIG. 15 further illustrates an example system for use of virtual reality and/or augmented reality with data center operations and cloud infrastructure services, in accordance with an embodiment.

FIG. 15 further illustrates an example system for use of virtual reality and/or augmented reality with data center operations and cloud infrastructure services, in accordance with an embodiment.

As illustrated in FIG. 15, in accordance with an embodiment, the VR/AR framework can receive real-time (or near-real-time) signals, metrics, analytics, or other data, from or associated with the physical data center equipment, servers, racks, sensors, or other devices, and other information or data via the data convergence layer or component. The system can be accessed via the VR/AR (computer) device, e.g., VR/AR headset that includes sensors that measure the position, orientation, and movement of a data center operator within the data center environment.

Figure 16:
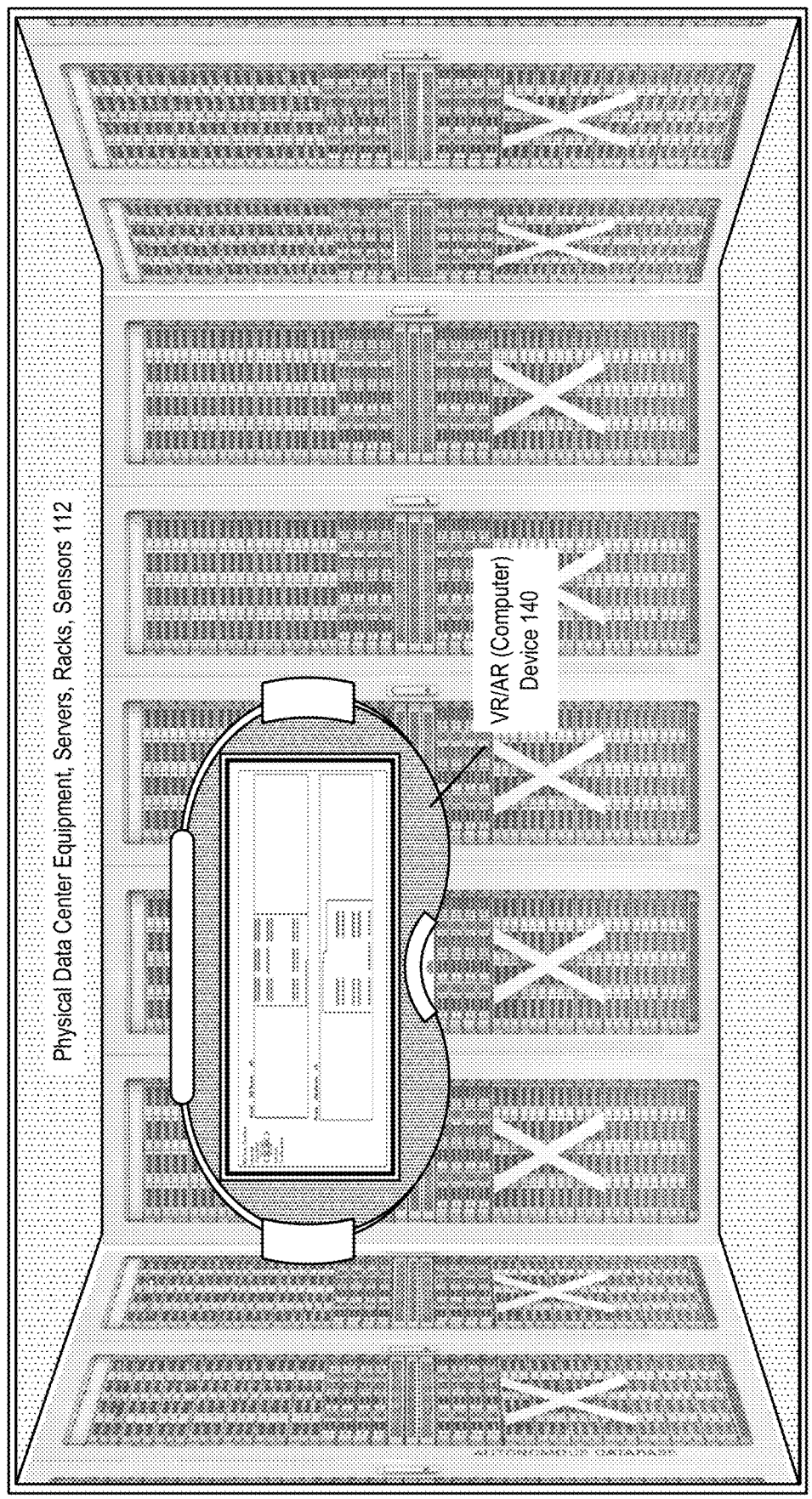
FIG. 16 further illustrates an example system for use of virtual reality and/or augmented reality with data center operations and cloud infrastructure services, in accordance with an embodiment.

FIG. 16 further illustrates an example system for use of virtual reality and/or augmented reality with data center operations and cloud infrastructure services, in accordance with an embodiment.

As illustrated in FIG. 16, in accordance with an embodiment, as the data center operator works within the cloud infrastructure or data center environment, using VR/AR-enabled interaction, the VR/AR (computer) device can display a visualization associated with the physical data center environment.

Figure 17:
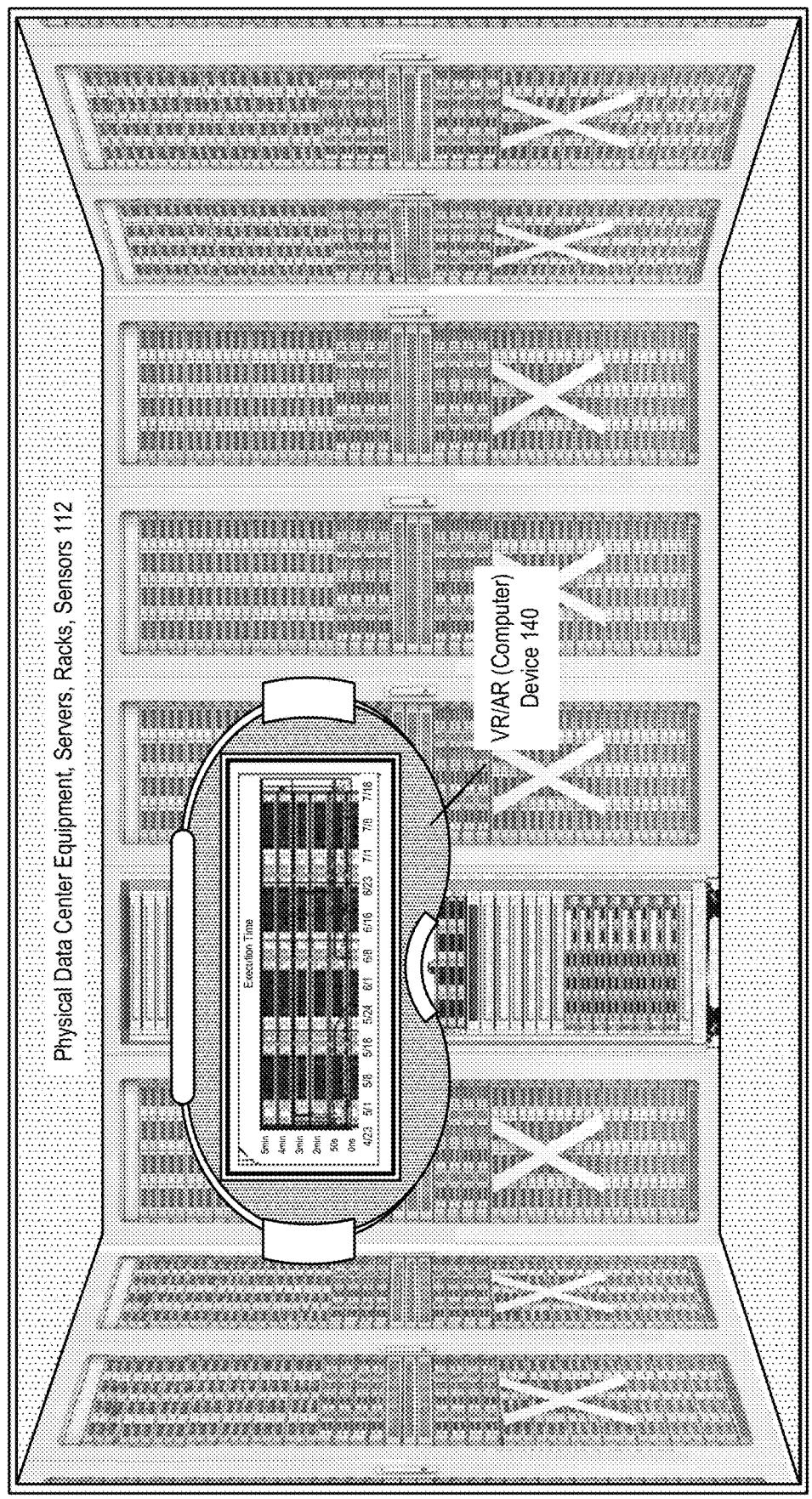
FIG. 17 further illustrates an example system for use of virtual reality and/or augmented reality with data center operations and cloud infrastructure services, in accordance with an embodiment.

FIG. 17 further illustrates an example system for use of virtual reality and/or augmented reality with data center operations and cloud infrastructure services, in accordance with an embodiment.

As illustrated in FIG. 17, in accordance with an embodiment, the visualization can include or be overlaid upon a displayed elevation of the rack, blade, slot, or other data center device to be examined.

Figure 18:
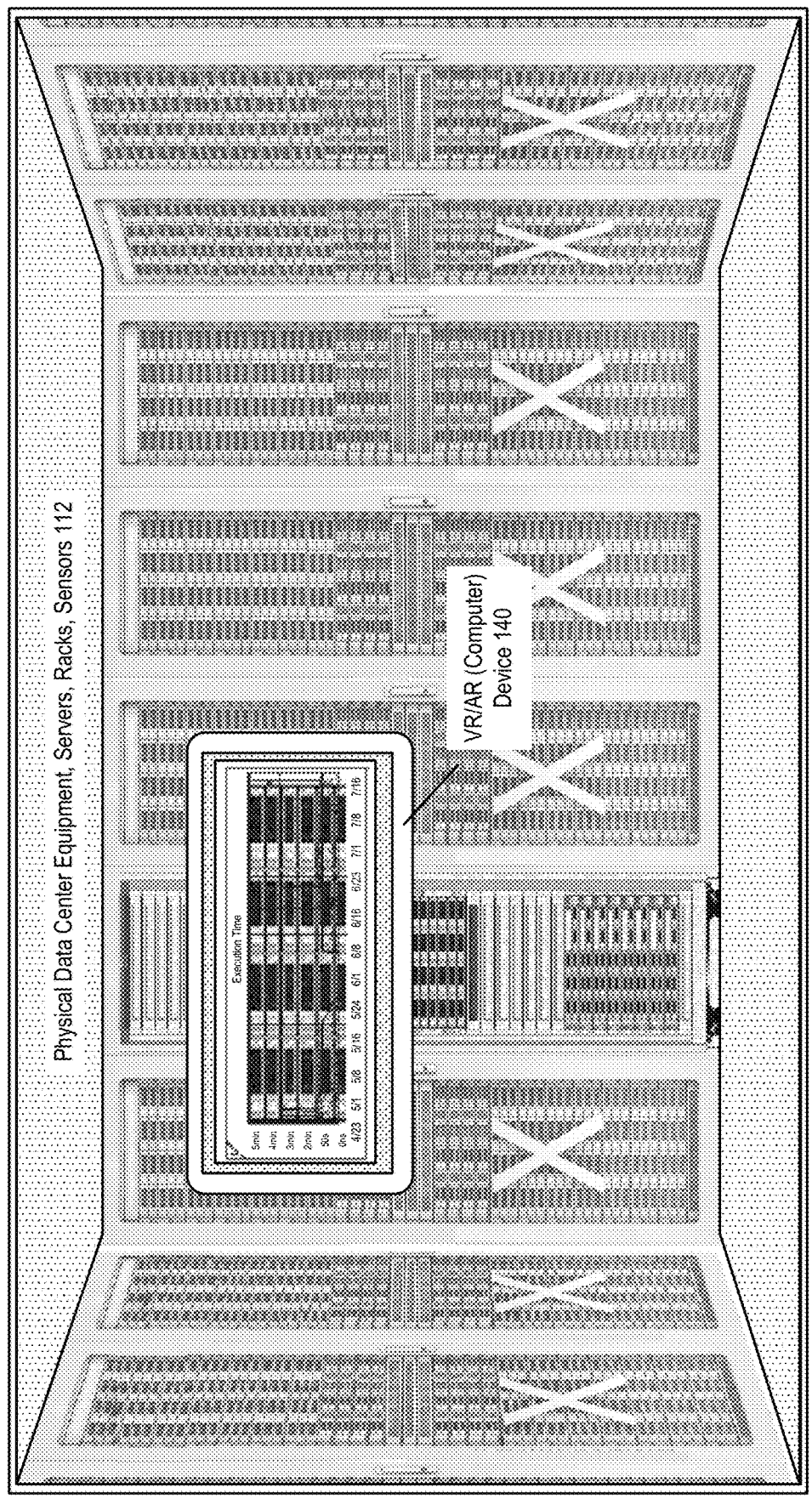
FIG. 18 further illustrates an example system for use of virtual reality and/or augmented reality with data center operations and cloud infrastructure services, in accordance with an embodiment.

FIG. 18 further illustrates an example system for use of virtual reality and/or augmented reality with data center operations and cloud infrastructure services, in accordance with an embodiment.

As illustrated in FIG. 18, in accordance with various embodiments, other types of VR/AR computer devices can be used, such as, for example, tablet or pad-like computer devices, or smart phones, wherein the visualization can include or be overlaid upon a displayed elevation of the rack, blade, slot, or other data center device to be examined.

Figure 19:
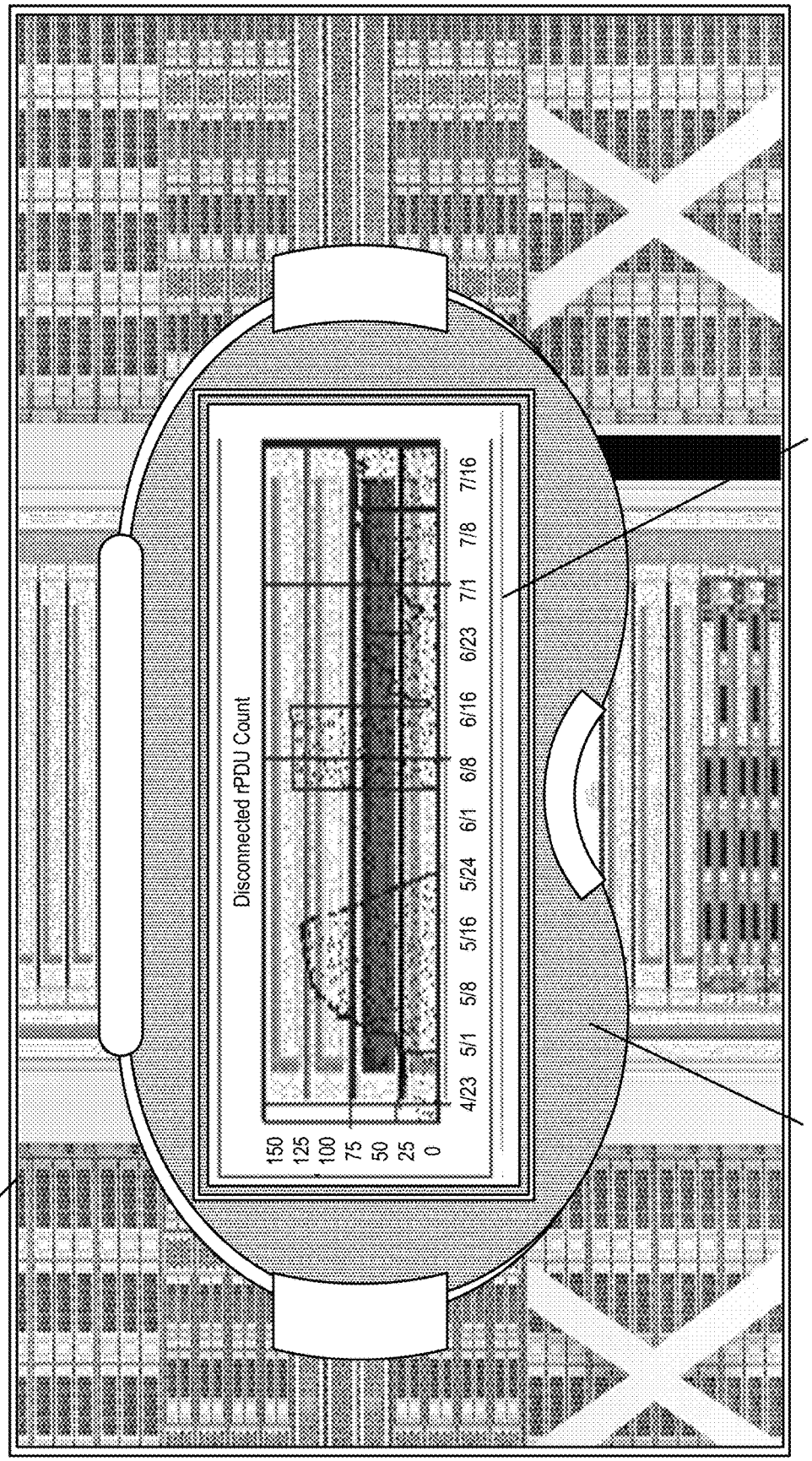
FIG. 19 further illustrates an example system for use of virtual reality and/or augmented reality with data center operations and cloud infrastructure services, in accordance with an embodiment.

FIG. 19 further illustrates an example system for use of virtual reality and/or augmented reality with data center operations and cloud infrastructure services, in accordance with an embodiment.

As illustrated in FIG. 19, in accordance with an embodiment, the visualization can include, for example, data center analytics and insights, which can be used to improve data center health diagnostics and prognostics.

Figure 20:
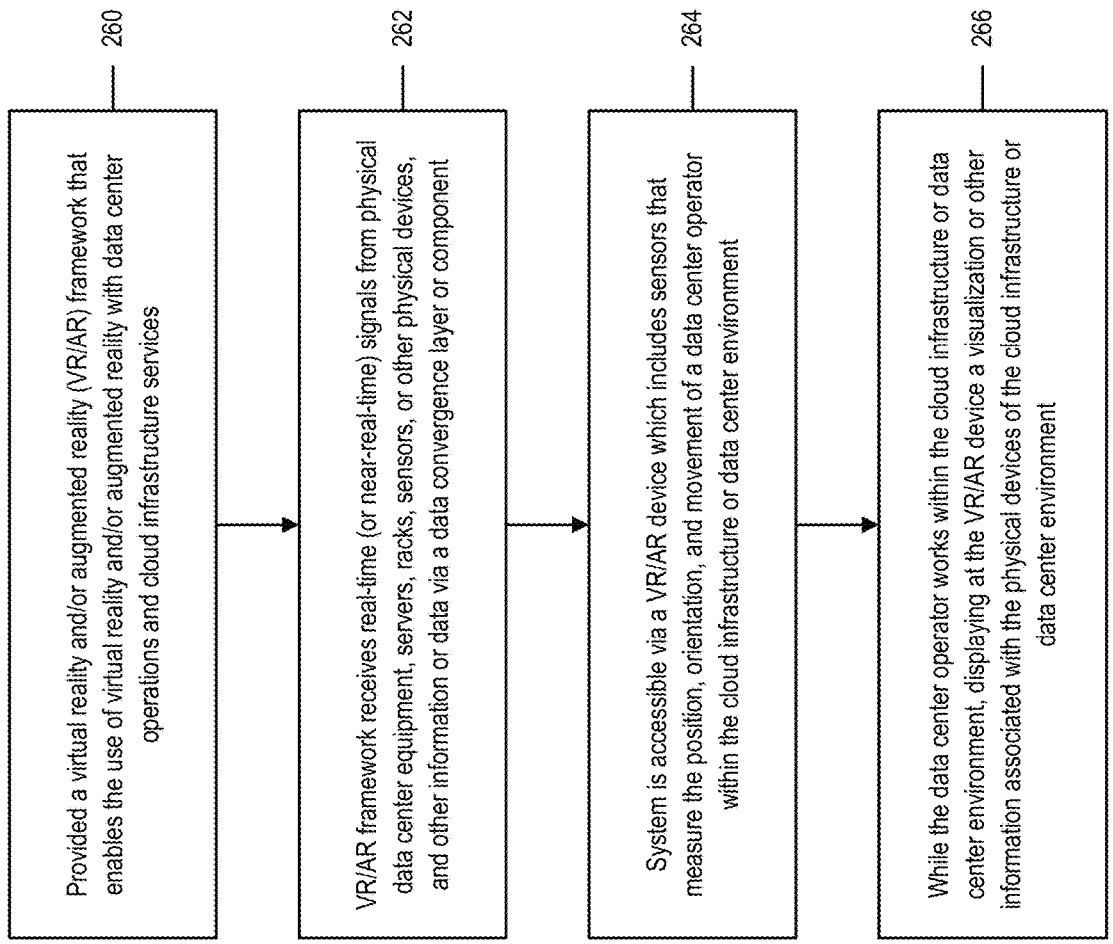
FIG. 20 illustrates a process for use of virtual reality and/or augmented reality with data center operations and cloud infrastructure services, in accordance with an embodiment.

FIG. 20 illustrates a process for use of virtual reality and/or augmented reality with data center operations and cloud infrastructure services, in accordance with an embodiment.

As illustrated in FIG. 20, in accordance with an embodiment, the process or method can include, at step 260, providing a VR/AR framework that enables the use of virtual reality and/or augmented reality with data center operations and cloud infrastructure services.

At step 262, the VR/AR framework receives real-time (or near-real-time) signals from physical data center equipment, servers, racks, sensors, or other physical devices, and other information or data via a data convergence layer or component.

At step 264, the system is accessible via a VR/AR device which includes sensors that measure the position, orientation, and movement of a data center operator within the cloud infrastructure or data center environment.

At step 266, while the data center operator works within the cloud infrastructure or data center environment, displaying at the VR/AR device a visualization or other information associated with the physical devices of the cloud infrastructure or data center environment.

Technical Advantages

In accordance with an embodiment, examples of various technical advantages provided by an AR/VR approach as described herein include that the data center operator can, for example:

Instantaneously access problem locations and, for example, zoom in on the problem server, or ports.

Accurately identify the granular location of problematic FRUs.

Securely login to devices as needed to initiate trouble shooting sequences right from his/her AR-enabled device.

Compare a last known good state versus bad state, read signatures and past events from FRUs e.g. Integrated Lights Out Manager (ILOM) messages, rack power distribution units (rPDU) information, and then take necessary follow-up steps in-situ.

Obtain detailed assessment of rack and surrounding environment (which were not part of any alerts), and feed the information back into the system or generate alerts in real-time (or near-real-time) when issues are detected or the system becomes aware of impending failure modes.

Trigger a switch to a redundant device or a diverse path for traffic to ensure uninterrupted traffic flow.

Initiate changes in repair/maintenance work flow based on observations and access to runbooks.

Run scripts to diagnose/repair/recover/validate work.

Verify up-close the status of amber light indicators and any discrepancies from devices, and compare in the VR/AR state what the internal machine reports as green/amber (both real and false light states).

Perform shut downs, disconnects, connects and restarts before or after many of the above sequences have been initiated and using the VR/AR enabled devices to initiate and take through completion a sequence of launch and rack bring up steps.

Optimize work performed by the data center operator using AR, including that touch points are minimized leveraging AR device capabilities.

Identify contextual discrepancies between asset information visible to them in the facilities and the one recorded within the central systems easily and drive auditable corrective updates.

Prioritize contextual information available in the facilities over conflicting information provided by central facilities and asset information systems, for the operations at hand.

Optimize workflows for receiving of new assets within a data center, for registration within, e.g., Data Center Infrastructure Management (data centerIM) and/or asset management services.

Use of VR/AR in Providing Data Center Analytics

In accordance with an embodiment, the addition of data center analytics and insights can also be used, for example, to improve data center health diagnostics and prognostics.

For example, in accordance with an embodiment, while walking around the data center halls and cages, the data center operator can gather insights on typical data center parameters such as: rack temperatures, server and port pluggables, temperatures, rack level power consumption, power supply usage, surges, interruption, SLA breaches on dropped packet or dropped frames, cable cuts or failures, hardware failures including field replaceable unit (FRU) failures, spikes in traffic or outage. Many of these are continuously monitored via dashboards upstream in a centralized command center while some are local to the data center.

In accordance with an embodiment, the data center operator can integrate SNMP or streaming telemetry from the physical data center space, and feed information for analytics (both health diagnostics and long term prognostics).

The data center operator, from within a VR/AR space, can review dashboards on demand and look at trends and gauge the health and status and launch some maintenance steps using specific AR configured execution menus.

Having this analytic information can enhance the overall awareness of surrounding environment such as when some localized areas within the data center starting to show signs of increased temperature as a result of impending equipment malfunction or poor air circulation or obstructions of cold air to some racks. Such types of information are not normally available in an alerts based intervention state.

Additionally, the use of AR/VR analytics based information gathering enables the data center operator to learn of issues by walking around in the data center while wearing the AR/VR enabled device, and/or information can be collected during routine walk-throughs and provided as an almost continuous dump into the streaming collector.

In accordance with an embodiment, the AR/VR and analytics approach can be used to help with remote management of data centers. A virtual representation of the physical data center space with all the details on the deployed fleet available (in a local sense and a global view across all data centers) allows remote management for the off-site engineers to assess, monitor and troubleshoot the data center issues, either standalone or in collaboration with the on-site operators.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use of virtual reality (VR) and/or augmented reality (AR) with data center operations and cloud infrastructure services, comprising:
   one or more computer devices operating within a data center and including a processor and memory and providing:
   a virtual reality and/or augmented reality (VR/AR) framework that enables the use of virtual reality and/or augmented reality with data center operations and cloud infrastructure services; and
   a data convergence layer or component that:
      receives information or data associated with physical data center equipment from sources including one or more of a ticket tracking system database, data center layout database, or knowledge management database, and
      communicates data between the data center and other locations, via a network or cloud, to communicate information to and/or receive assistance from one or more remote data center specialists;
   wherein the VR/AR framework receives real-time or near-real-time signals from physical data center equipment, including servers, racks, sensors, or other physical devices, and other information or data via the data convergence layer or component, wherein the data convergence layer or component operates to communicate and receive the information or data associated with the data center equipment between the data center and other systems or sources of data;
   wherein the system is accessible via a VR/AR device which includes sensors that measure the position, orientation, and movement of a data center operator within the cloud infrastructure or data center environment;
   wherein as the data center operator works within the cloud infrastructure or data center environment, and interacts with particular data center equipment, the VR/AR device:
      displays a visualization or other information associated with the particular data center equipment or the data center environment,
      based on the information received via the data convergence layer or component and associated with the particular data center equipment being examined, and
      overlaid upon a view of the particular data center equipment;
   wherein the system utilizes an event-driven model that operates in a dynamic manner, including that the information displayed is updated in real-time or near-real-time to reflect what the data center operator is seeing;

wherein the information includes data center related analytics describing particular data center components; and wherein the system operates so that information including data center related analytics is gathered from multiple systems or sources, filtered, and overlaid upon the view of the particular data center equipment, to provide a visualization having focused information for the data center operator.

2. The system of claim 1, wherein the data convergence layer or component enables communication of data between the data center and other locations, via a network/cloud, including one or more remote data center specialists.

3. The system of claim 1, wherein the visualization includes or is overlaid upon a displayed elevation of a rack, blade, slot, or other physical device of the data center to be examined.

4. The system of claim 1, wherein the data convergence layer or component enables receipt of information from other sources of data, including one or more of a ticket tracking system (database), data center layout (database), or knowledge management database.

5. The system of claim 4, wherein the information includes data center related analytics describing problems that have occurred with particular data center components.

6. The system of claim 4, wherein the information is gathered from multiple other systems or sources, and then filtered or otherwise processed to provide focused information for the data center operator.

7. A method for use of virtual reality and/or augmented reality with data center operations and cloud infrastructure services, comprising:
providing, within a data center, a system including a virtual reality and/or augmented reality (VR/AR) framework that enables the use of virtual reality and/or augmented reality with data center operations and cloud infrastructure services;
providing a data convergence layer or component that:
receives information or data associated with physical data center equipment from sources including one or more of a ticket tracking system database, data center layout database, or knowledge management database, and
communicates data between the data center and other locations, via a network or cloud, to communicate information to and/or receive assistance from one or more remote data center specialists;
wherein the VR/AR framework receives real-time or near-real-time signals from physical data center equipment, including servers, racks, sensors, or other physical devices, and other information or data via data convergence layer or component, wherein the data convergence layer or component operates to communicate and receive the information or data associated with the data center equipment between the data center and other systems or sources of data;
wherein the system is accessible via a VR/AR device which includes sensors that measure the position, orientation, and movement of a data center operator within the cloud infrastructure or data center environment; and
while the data center operator works within the cloud infrastructure or data center environment, and interacts with particular data center equipment:
displaying at the VR/AR device a visualization or other information associated with the particular data center equipment or the data center environment,
based on the information received via the data convergence layer or component and associated with the particular data center equipment being examined, and
overlaid upon a view of the particular data center equipment;
wherein the system utilizes an event-driven model that operates in a dynamic manner, including that the information displayed is updated in real-time or near-real-time to reflect what the data center operator is seeing;
wherein the information includes data center related analytics describing particular data center components; and
wherein the system operates so that information including data center related analytics is gathered from multiple systems or sources, filtered, and overlaid upon the view of the particular data center equipment, to provide a visualization having focused information for the data center operator.

8. The method of claim 7, wherein the data convergence layer or component enables communication of data between the data center and other locations, via a network/cloud, including one or more remote data center specialists.

9. The method of claim 7, wherein the visualization includes or is overlaid upon a displayed elevation of a rack, blade, slot, or other physical device of the data center to be examined.

10. The method of claim 7, wherein the data convergence layer or component enables receipt of information from other sources of data, including one or more of a ticket tracking system (database), data center layout (database), or knowledge management database.

11. The method of claim 10, wherein the information includes data center related analytics describing problems that have occurred with particular data center components.

12. The method of claim 10, wherein the information is gathered from multiple other systems or sources, and then filtered or otherwise processed to provide focused information for the data center operator.

13. A non-transitory computer readable storage medium, including instructions stored thereon which when read and executed by one or more computers cause the one or more computers to perform a method comprising:
providing, within a data center, a system including a virtual reality and/or augmented reality (VR/AR) framework that enables the use of virtual reality and/or augmented reality with data center operations and cloud infrastructure services;
providing a data convergence layer or component that:
receives information or data associated with physical data center equipment from sources including one or more of a ticket tracking system database, data center layout database, or knowledge management database, and
communicates data between the data center and other locations, via a network or cloud, to communicate information to and/or receive assistance from one or more remote data center specialists;
wherein the VR/AR framework receives real-time or near-real-time signals from physical data center equipment, including servers, racks, sensors, or other physical devices, and other information or data via data convergence layer or component, wherein the data convergence layer or component operates to communicate and receive the information or data associated with the data center equipment between the data center and other systems or sources of data;

wherein the system is accessible via a VR/AR device which includes sensors that measure the position, orientation, and movement of a data center operator within the cloud infrastructure or data center environment; and while the data center operator works within the cloud infrastructure or data center environment, and interacts with particular data center equipment:

displaying at the VR/AR device a visualization or other information associated with the particular data center equipment or the data center environment, based on the information received via the data convergence layer or component and associated with the particular data center equipment being examined, and overlaid upon a view of the particular data center equipment;

wherein the system utilizes an event-driven model that operates in a dynamic manner, including that the information displayed is updated in real-time or near-real-time to reflect what the data center operator is seeing;

wherein the information includes data center related analytics describing particular data center components; and wherein the system operates so that information including data center related analytics is gathered from multiple systems or sources, filtered, and overlaid upon the view of the particular data center equipment, to provide a visualization having focused information for the data center operator.

14. The non-transitory computer readable storage medium of claim 13, wherein the data convergence layer or component enables communication of data between the data center and other locations, via a network/cloud, including one or more remote data center specialists.

15. The non-transitory computer readable storage medium of claim 13, wherein the visualization includes or is overlaid upon a displayed elevation of a rack, blade, slot, or other physical device of the data center to be examined.

16. The non-transitory computer readable storage medium of claim 13, wherein the data convergence layer or component enables receipt of information from other sources of data, including one or more of a ticket tracking system (database), data center layout (database), or knowledge management database.

17. The non-transitory computer readable storage medium of claim 16, wherein the information includes data center related analytics describing problems that have occurred with particular data center components.

18. The non-transitory computer readable storage medium of claim 16, wherein the information is gathered from multiple other systems or sources, and then filtered or otherwise processed to provide focused information for the data center operator.

19. The system of claim 1, wherein the system operates so that, while the VR/AR framework receives the real-time or near-real-time signals from physical data center equipment, including servers, racks, sensors, or other physical devices, and other information or data via the data convergence layer, the system determines that one or more physical devices may be functioning improperly, and displays a visualization alerting of that condition.

\* \* \* \* \*